(12) United States Patent
Veros et al.

(10) Patent No.: US 10,267,022 B2
(45) Date of Patent: Apr. 23, 2019

(54) ELECTRONIC FAUCET

(71) Applicant: Delta Faucet Company, Indianapolis, IN (US)

(72) Inventors: Michael J. Veros, Carmel, IN (US); Kurt J. Thomas, Indianapolis, IN (US); Mark Galambus, Carmel, IN (US); Adam M. DeVries, Anderson, IN (US); Anthony E. Tyner, Cicero, IN (US); Joel D. Sawaski, Indianapolis, IN (US); Kyle Robert Davidson, Noblesville, IN (US)

(73) Assignee: Delta Faucet Company, Indianapolis, IN (US)

( * ) Notice: Subject to any disclaimer, the term of this patent is extended or adjusted under 35 U.S.C. 154(b) by 33 days.

(21) Appl. No.: 15/224,430

(22) Filed: Jul. 29, 2016

(65) Prior Publication Data

US 2016/0333556 A1    Nov. 17, 2016

Related U.S. Application Data

(62) Division of application No. 14/362,765, filed as application No. PCT/US2012/068265 on Dec. 6, 2012.

(60) Provisional application No. 61/567,510, filed on Dec. 6, 2011.

(51) Int. Cl.
| | |
|---|---|
| *E03C 1/02* | (2006.01) |
| *E03C 1/04* | (2006.01) |
| *E03C 1/05* | (2006.01) |
| *F16K 31/04* | (2006.01) |
| *F16K 37/00* | (2006.01) |
| *F16K 11/074* | (2006.01) |

(52) U.S. Cl.
CPC ............ *E03C 1/055* (2013.01); *E03C 1/0404* (2013.01); *F16K 11/074* (2013.01); *F16K 31/043* (2013.01); *F16K 37/0041* (2013.01); *E03C 2001/026* (2013.01)

(58) Field of Classification Search
CPC ...................................................... E03C 1/055
USPC .......................................................... 4/677
See application file for complete search history.

(56) References Cited

U.S. PATENT DOCUMENTS

| | | |
|---|---|---|
| 4,243,063 A | 1/1981 | Parkison |
| 4,700,885 A | 10/1987 | Knebel |
| 4,869,427 A | 9/1989 | Kawamoto et al. |
| 5,170,361 A | 12/1992 | Reed |

(Continued)

FOREIGN PATENT DOCUMENTS

EP    0831260 A2    3/1998

OTHER PUBLICATIONS

International Search Report and Written Opinion dated Apr. 8, 2013 in related International Application No. PCT/US2012/068265.

*Primary Examiner* — Christine J Skubinna

(74) *Attorney, Agent, or Firm* — Faegre Baker Daniels LLP

(57) ABSTRACT

An electronic faucet assembly includes a mixing valve and a user interface in communication with a controller. Input to the user interface illustratively causes the controller to operate in a flow control mode or a temperature control mode. In the flow control mode the mixing valve provides flow control of water at a constant temperature, while in the temperature control mode the mixing valve provides temperature control of water at a constant flow. A memory device may be secured to a faucet component to store identification data related thereto.

20 Claims, 19 Drawing Sheets

(56) References Cited

U.S. PATENT DOCUMENTS

| | | |
|---|---|---|
| 6,029,699 A | 2/2000 | Granot |
| 6,321,786 B2 | 11/2001 | Schumacher |
| 6,640,357 B1 | 11/2003 | Chang |
| 6,789,573 B2 | 9/2004 | Knapp |
| 6,805,151 B1 | 10/2004 | Chang |
| 6,854,658 B1 | 2/2005 | Houghton et al. |
| 7,014,166 B1 | 3/2006 | Wang |
| 7,040,348 B2 | 5/2006 | Bolgar |
| 7,174,916 B2 | 2/2007 | Chang |
| 7,389,793 B2 | 6/2008 | Wang |
| 7,458,520 B2 | 12/2008 | Belz et al. |
| 8,162,236 B2 | 4/2012 | Rodenbeck et al. |
| 8,365,767 B2 | 2/2013 | Davidson et al. |
| 2004/0041033 A1 | 3/2004 | Kemp |
| 2007/0044850 A1 | 3/2007 | Pieters |
| 2007/0246550 A1 * | 10/2007 | Rodenbeck ............ E03C 1/057 236/12.11 |
| 2008/0072965 A1 | 3/2008 | Buechel |
| 2009/0039176 A1 | 2/2009 | Davidson et al. |
| 2011/0253220 A1 | 10/2011 | Sawaski et al. |

\* cited by examiner

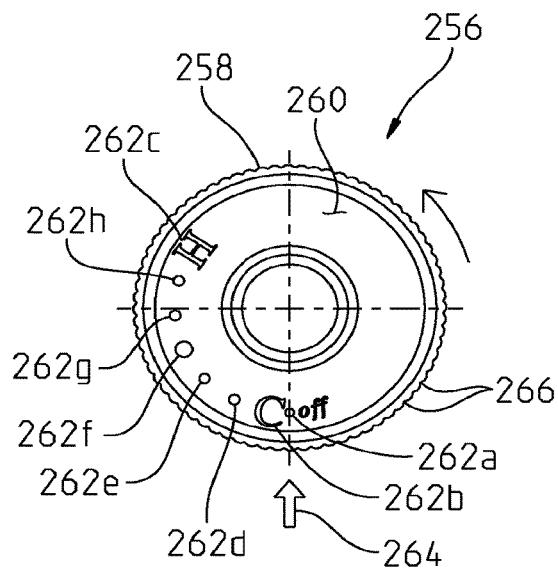
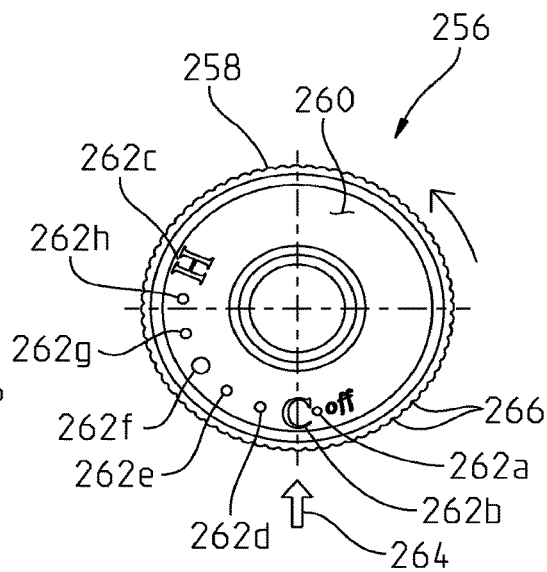
Fig. 14A     Fig. 14B
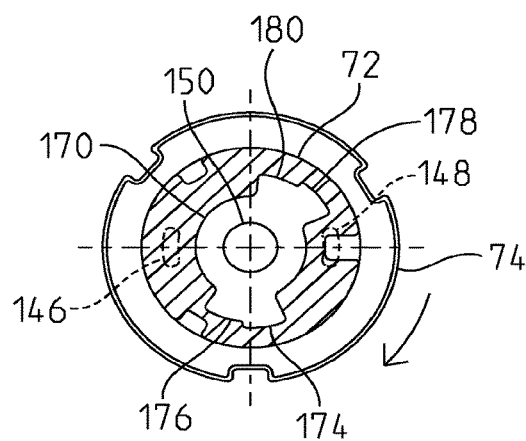
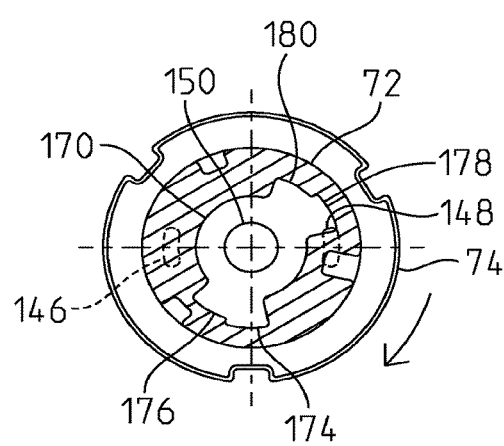
Fig. 15A     Fig. 15B

ELECTRONIC FAUCET

CROSS-REFERENCE TO RELATED APPLICATION

This application is a divisional of U.S. patent application Ser. No. 14/362,765, filed Jun. 4, 2014, which is a national phase filing of International Application No. PCT/US2012/068265, filed Dec. 6, 2012, which claims the benefit of U.S. Provisional Patent Application Ser. No. 61/567,510, filed Dec. 6, 2011, the disclosures of which are expressly incorporated by reference herein.

BACKGROUND AND SUMMARY OF THE INVENTION

The present disclosure relates to an electronic faucet. More particularly, the disclosure relates to an electronic faucet including a mixing valve providing variable flow control, and a memory device storing faucet component data.

Mixing valves including rotatable valve members or discs are known in the art. Such mixing valves are sometimes referred to as cycling valves and provide for the mixing of hot and cold water for delivery to an outlet. More particularly, outlet water temperature is increased when the valve disc is rotated in a first direction to provide for an increased ratio of hot water to cold water, and outlet water temperature is decreased when the valve disc is rotated in an opposite direction to provide for an increased ratio of cold water to hot water.

An illustrative embodiment of the present disclosure includes an electronic faucet allowing for flow control of outlet water at a fixed temperature, and for temperature control of outlet water at a fixed flow rate. A cycling valve operably coupled to an actuator provides for flow control of cold water by rotating the valve disc to intermediate off and full cold flow positions, and provides for temperature control by rotating the valve disc between full cold and full hot positions. An electronic user interface operably coupled to the cycling valve provides a user selective variable flow control in a system primarily designed for water mixing.

According to an illustrative embodiment of the present disclosure, an electronic faucet includes a delivery spout having a dispensing outlet and configured to be supported by a mounting deck. A mixing valve is fluidly coupled to the delivery spout and includes a hot water inlet, a cold water inlet spaced from the hot water inlet, and an outlet spaced from the hot water inlet and the cold water inlet. A valve member is supported for movement relative to the hot water inlet and the cold water inlet to control the flow of water from the hot water inlet and the cold water inlet to the outlet. An actuator is operably coupled to the valve member for moving the valve member. A controller is operably coupled to the actuator and is configured to selectively provide a flow control mode of operation and a temperature control mode of operation by causing the actuator to move the valve member. A user interface is in communication with the controller. Input to the user interface within a first input range causes the controller to operate in the flow control mode, and input to the user interface within a second input range causes the controller to operate in the temperature control mode. The flow control mode positions the valve member to provide variable flow rate of water through the cold water inlet to the outlet while preventing the flow of water through the hot water inlet to the outlet. The temperature control mode positions the valve member to provide a substantially constant flow rate of water through the outlet and variable mixing of water from the hot water inlet and the cold water inlet to adjust the temperature of water in the outlet.

According to another illustrative embodiment of the present disclosure, an electronic faucet includes a delivery spout having a dispensing outlet and supported above a mounting deck. A mixing valve is supported below the mounting deck and includes a hot water inlet, a cold water inlet spaced from the hot water inlet, an outlet spaced from the hot water inlet and the cold water inlet, and a valve member supported for movement relative to the hot water inlet and the cold water inlet to control the flow of water from the hot water inlet and the cold water inlet to the outlet. An actuator is operably coupled to the valve member for moving the valve member. A controller is operably coupled to the actuator and is configured to provide a flow control mode and a temperature control mode by causing the actuator to move the valve member. The flow control mode provides variable flow rate of water through the cold water inlet to the outlet while preventing the flow of water through the hot water inlet to the outlet. The temperature control mode provides substantially constant flow rate of water through the outlet and variable mixing of water from the hot water inlet and the cold water inlet to adjust the temperature of water at the outlet. A valve position sensor is operably coupled to the valve member and is in electrical communication with the controller. A user interface is in electrical communication with the controller and comprises a rotatable input member. A user interface position sensor is operably coupled to the input member and is in electrical communication with the controller. The controller causes the actuator to move the valve member in response to input from the user interface position sensor. Rotation of the input member within a first angular range causes the controller to operate in the flow control mode, and rotation of the input member within a second angular range causes the controller to operate in the temperature control mode. The flow control mode provides variable flow rate of water through the cold water inlet to the outlet while preventing the flow of water through the hot water inlet to the outlet, and the temperature control mode provides substantially constant flow rate of water through the outlet and variable mixture of water from the hot water inlet and the cold water inlet to adjust the temperature of water at the outlet.

According to a further illustrative embodiment of the present disclosure, an electronic faucet includes a mixing valve having a hot water inlet, a cold water inlet spaced from the hot water inlet, an outlet spaced from the hot water inlet and the cold water inlet, and a valve member supported for movement relative to the hot water inlet and the cold water inlet to control the flow of water from the hot water inlet and the cold water inlet to the outlet. An actuator is operably coupled to the valve member for moving the valve member. A controller is operably coupled to the actuator and is configured to provide a flow control mode and a temperature control mode by causing the actuator to move the valve member. A valve position sensor is operably coupled to the valve member and is in electrical communication with the controller. A user interface is operably coupled to the controller and comprises a rotatable input member. A user interface position sensor is operably coupled to the input member and is in electrical communication with the controller. The controller causes the actuator to move the valve member in response to input from the user interface position sensor. A temperature sensor is in electrical communication with the controller and is configured to measure temperature of water provided to the outlet. The controller provides incremental water temperature control within a predetermined temperature range by associating rotational position of the valve member with a selective one of a plurality of setpoint temperatures. The setpoint temperatures within a predetermined range are linearized between a cold temperature limit and a hot temperature limit. The controller causes the actuator to move the valve member to a predicted position based upon the selected setpoint temperature, and adjusts the position of the valve member based upon measured temperature feedback from the temperature sensor.

According to another illustrative embodiment of the present disclosure, an electronic faucet includes a delivery spout having a dispensing outlet and supported above a mounting deck. A mixing valve is fluidly coupled to the delivery spout and includes a hot water inlet, a cold water inlet spaced from the hot water inlet, an outlet spaced from the hot water inlet and the cold water inlet, and a valve member supported for rotation relative to the hot water inlet and the cold water inlet to control the flow of water from the hot water and cold water inlets to the outlet. An electrically operable actuator is operably coupled to the valve member for moving the valve member. A controller is operably coupled to the actuator. A user interface is in electrical communication with the controller and comprises a rotatable input member. The controller causes the actuator to rotate the valve member in response to rotation of the input member, such that successive rotation of the valve member provides for flow control of water at constant temperature to the outlet, followed by temperature control of water at constant flow to the outlet.

According to a further illustrative embodiment of the present disclosure, an electronic faucet includes an upper faucet component configured to be coupled above a sink deck, the upper faucet component including a user interface. An electrically operable valve is configured to be supported below the sink deck. A component memory device is secured to the upper faucet component, the component memory device storing identification data associated with the faucet component. A controller is in electrical communication with the user interface, the electrically operable valve and the component memory device, the controller configured to receive the control configuration from the component memory device, the identification data representative of a control configuration of the user interface, the controller selecting a set of instructions based upon the control configuration, the set of instructions controlling operation of the electrically operable valve in response to input from the user interface.

According to another illustrative embodiment of the present disclosure, an electronic faucet assembly includes a faucet component, and a component memory device secured to the faucet component, the component memory device storing identification data associated with the faucet component. A controller is in electrical communication with the component memory device, the controller determining a control configuration based upon the identification data received from the component memory device, and operating the faucet based upon the determined control configuration.

According to a further illustrative embodiment of the present disclosure, a method of controlling operation of a faucet includes the steps of providing a plurality of faucet components and a controller, at least one of the faucet components including a memory device in electrical communication with the controller, and at least one of the faucet components including an electrically operable valve in electrical communication with the controller. The method further includes the steps of transmitting identification data associated with the faucet component from the memory device to the controller, and selecting instructions with the controller for operating the electrically operable valve based upon the identification data.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIGS. 14A-14F are top plan views of different angular positions of the user interface input member;

FIGS. 15A-15F are top plan views of different angular of the flow control member associated with the angular positions of the user interface input member of FIGS. 14A-14F, respectively;

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
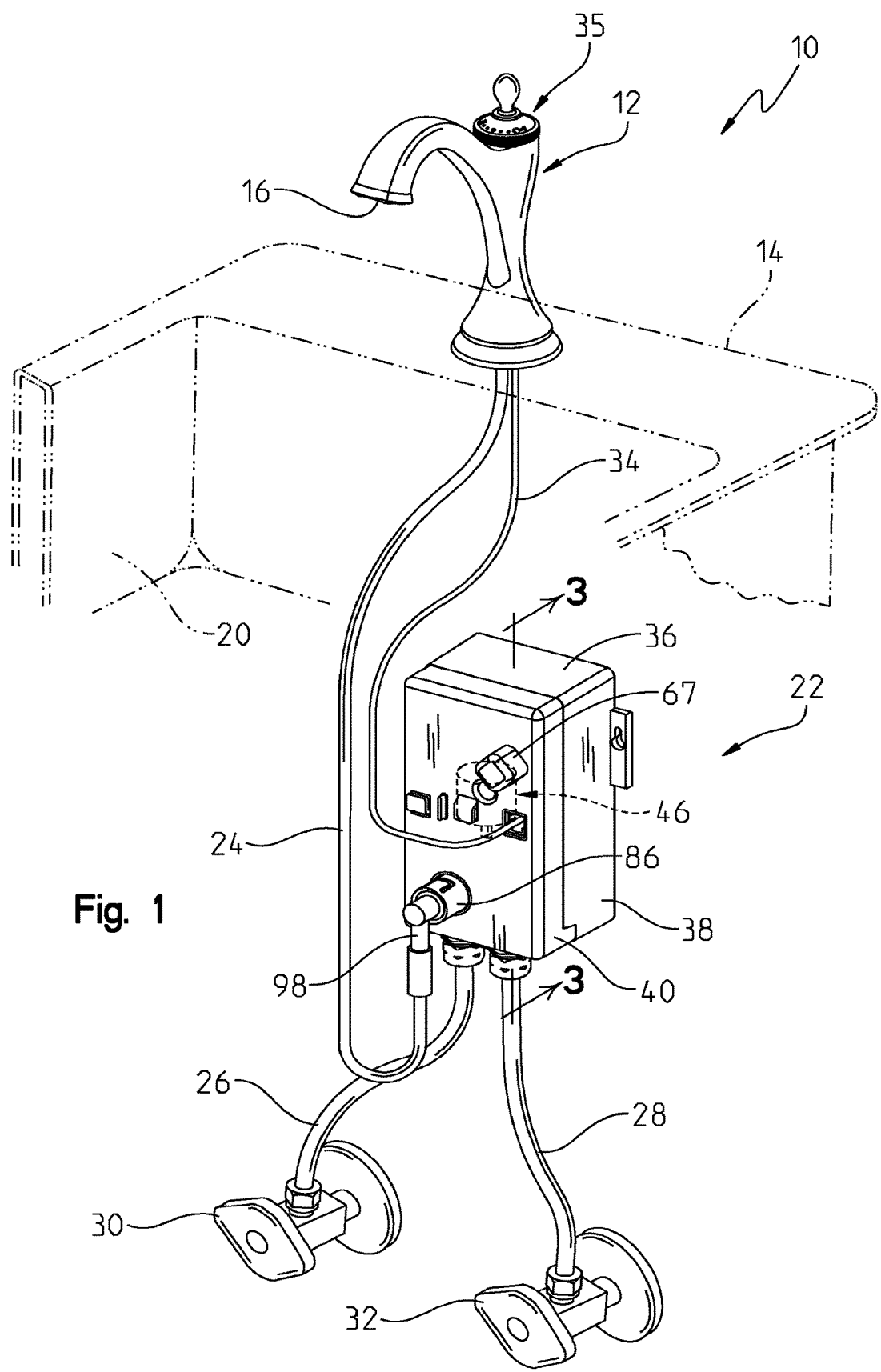
FIG. 1 is a perspective view of an illustrative electronic faucet mounted to a sink deck and fluidly coupled to hot and cold water supplies.

With reference initially to FIG. 1, an illustrative electronic faucet 10 according to the present disclosure includes an upper faucet component, illustratively a delivery spout 12, coupled to a mounting deck 14. The delivery spout 12 extends above the mounting deck 14 for dispensing water through a dispensing end or outlet 16 into a sink basin 20. An electronic flow control system 22 is illustratively supported below the mounting deck 14 and is fluidly coupled to the delivery spout 12 through a dispensing conduit 24. A hot water supply line or conduit 26 and a cold water supply line or conduit 28 are fluidly coupled to the electronic flow control system 22. More particularly, the fluid supply conduits 26 and 28 are configured to provide water from hot and cold water supplies, such as conventional stops 30 and 32, respectively, to the electronic flow control system 22.

The dispensing conduit 24 provides a fluid coupling between the delivery spout 12 and the electronic flow control system 22. Similarly, an electrical cable 34 provides an electrical coupling between a user interface 35 supported by the delivery spout 12 above the mounting deck 14 and the electronic flow control system 22.

Figure 2:
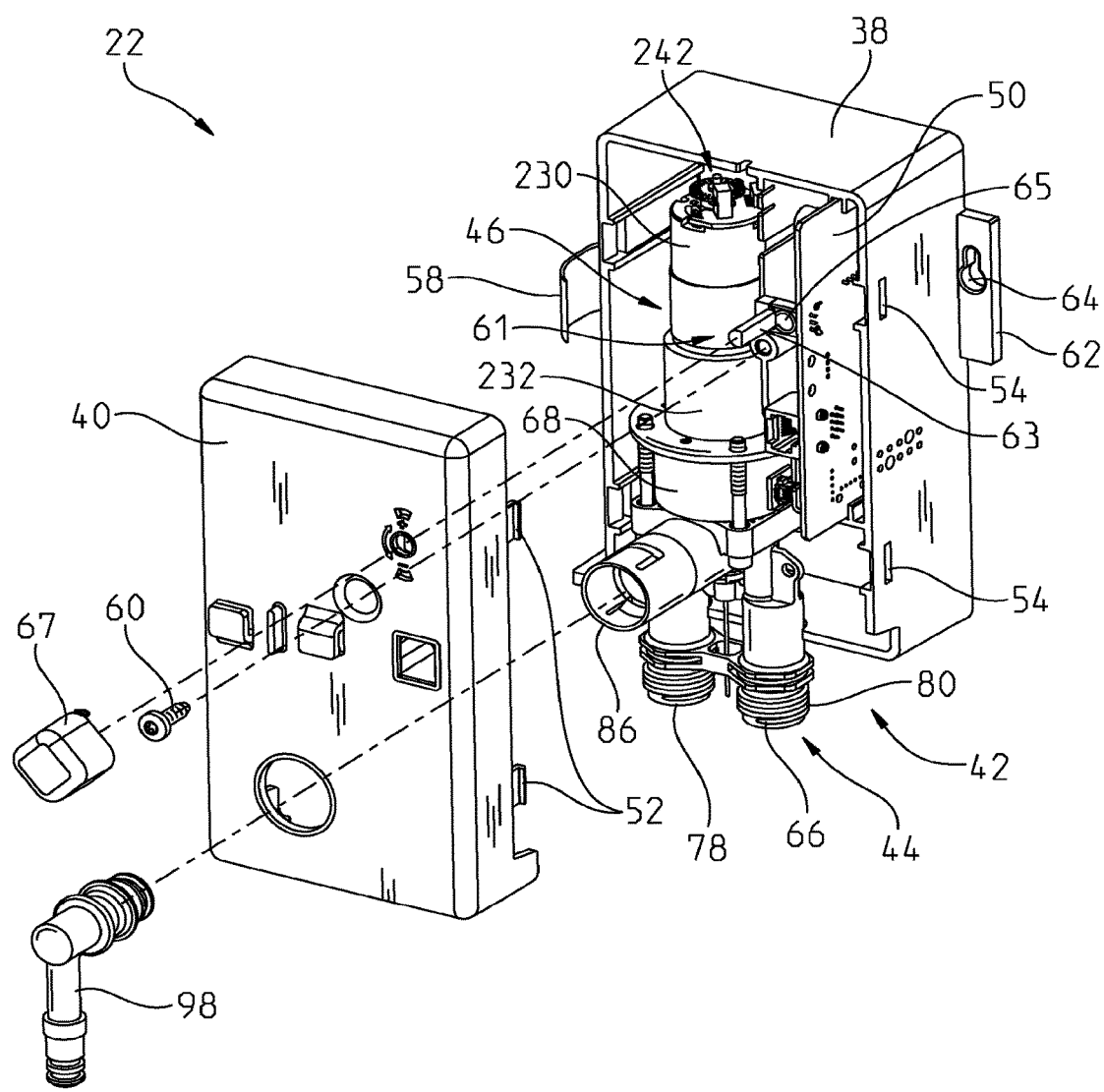
FIG. 2 is an exploded perspective view of the electronic valve assembly of the faucet of FIG. 1.
Figure 3:
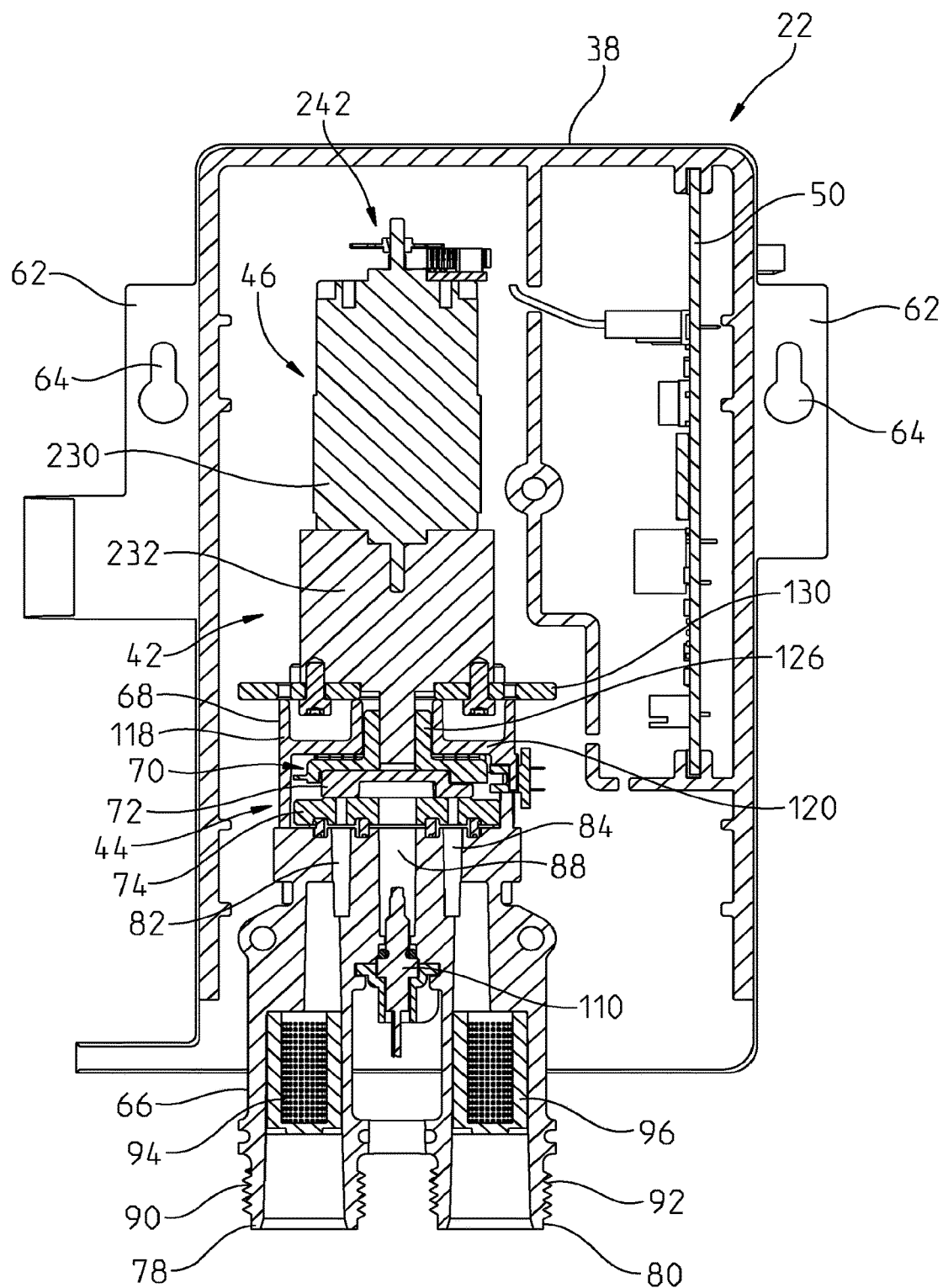
FIG. 3 is a cross-sectional view taken along line 3-3 of FIG. 1.
Figure 4:
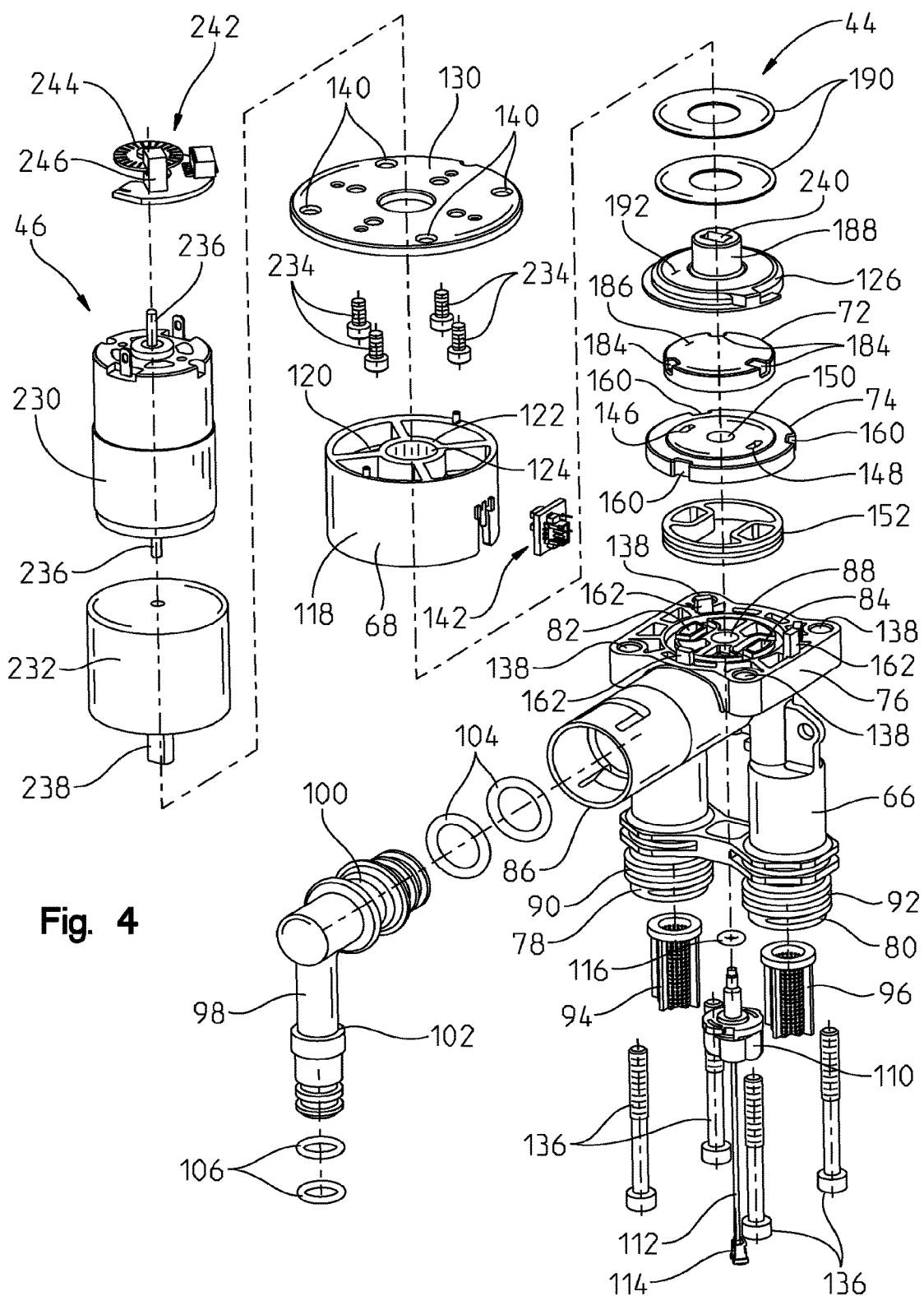
FIG. 4 is an upper exploded perspective view of the mixing valve of the electronic valve assembly of FIG. 2.
Figure 5:
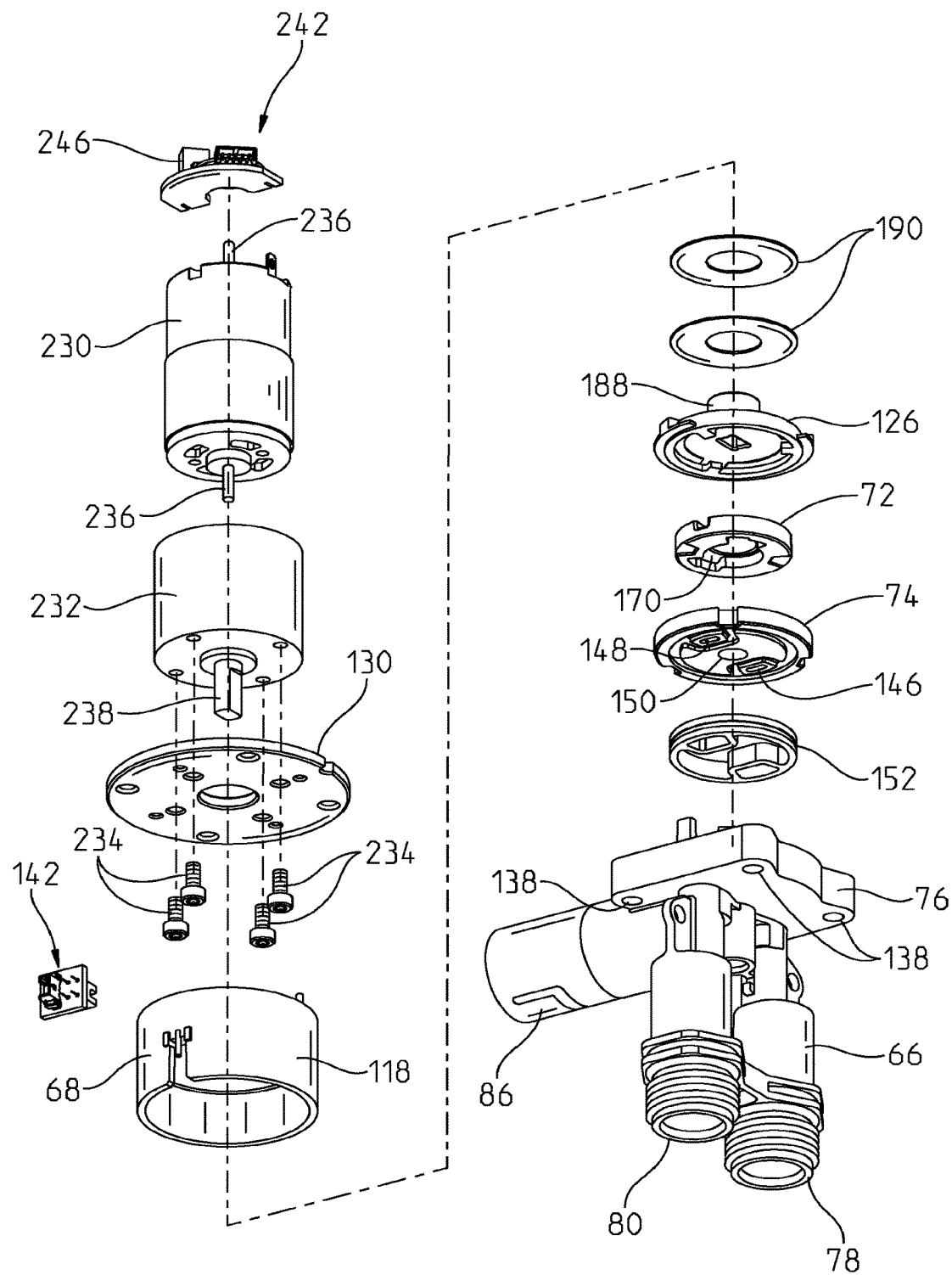
FIG. 5 is a lower exploded perspective view of the mixing valve of FIG. 4.

Referring now to FIGS. 2 and 3, the electronic flow control system 22 illustratively includes a housing 36 configured to be mounted below the mounting deck 14. The housing 36 includes a rear portion 38 coupled to a front portion or cover 40 defining an enclosure 42 to receive a mixing valve 44, a valve actuator 46 operably coupled to the mixing valve 44, and a controller 50 in communication with the actuator 46. The mixing valve 44 and valve actuator 46 may be referred to as an electronic proportioning valve (EPV) or electrically operably valve. The cover 40 includes tabs 52 configured to be received within openings or slots 54 of the rear portion 38. The rear portion 38 includes a resilient latch 58 to secure the cover 40 to the rear portion 38 of the housing 36. A screw 60 may be threadably received within a boss to the rear portion 38 to further secure the cover 40 thereto. The rear portion 38 illustratively includes a pair of mounting tabs 62 with apertures 64 for receiving fasteners (not shown) therein to secure the electronic flow control system 22 to a mounting surface below the deck 14.

A maximum temperature user input 61 is supported within the enclosure 42 and is in electrical communication with the controller 50. The maximum temperature user input 61 illustratively includes a rotatable shaft 63 accessible by a user and operably coupled to a rotary switch 65. By rotating the shaft 63 and corresponding switch 65 between different discrete positions, a maximum or hot temperature limit is set (illustratively, three limits may be set: 110° F., 115° F., and 120° F.). As further detailed herein, the controller 50 prevent the mixing valve 44 from supplying water to the spout 12 exceeding the hot temperature limit. A cap 67 covers the shaft 63 and is removably supported by the cover 40 of the housing 36.

The mixing valve 44 is positioned within the enclosure 42 defined by housing 36. The mixing valve 44 includes a valve body 66 operably coupled to a valve housing 68. The valve body 66 and the valve housing 68 together define a chamber 70 receiving flow control members 72 and 74. The mixing valve 44 and, more particularly the flow control members 72 and 74, control the flow of water from the fluid supply conduits 26 and 28 to the dispensing conduit 24.

The valve body 66 illustratively includes a base 76 supporting the flow control members 72 and 74. A hot water inlet 78 and a cold water inlet 80 are in fluid communication with a hot water inlet port 82 and a cold water inlet port 84, respectively, of the base 70. Similarly, an outlet 86 is in fluid communication with an outlet port 88 of the base 76 and extends perpendicular to the inlets 78 and 80. The inlets 78 and 80 include fluid couplings, illustratively external threads 90 and 92, configured to be fluidly coupled to the fluid supply conduits 26 and 28, respectively.

Filter screens 94 and 96 are illustratively received within the hot water and cold water inlets 78 and 80, respectively. A swivel adapter 98 is fluidly and rotatably coupled to the outlet 86. The swivel adapter 98 illustratively includes a first conduit 100 fluidly coupled to the outlet 86, and a second conduit 102 extending perpendicular to the first conduit 100 and configured to be fluidly coupled to the dispensing conduit 24. O-rings 104 seal the swivel adapter 98 with the valve body 66, and o-rings 106 seal the swivel adapter 98 with the dispensing conduit 24.

As further detailed herein, a temperature sensor or thermistor 110 is fluidly coupled to the outlet 86. An electrical wire 112 having a connector 114 electrically couples the temperature sensor 110 to the controller 50. The temperature sensor 110 measures the temperature of water delivered to the outlet port 88 and provides a signal indicative thereof to the controller 50. An o-ring 116 seals the temperature sensor 110 within the outlet 86.

The valve housing 68 illustratively includes a cylindrical sidewall 118 and an end cap or wall 120. A boss 122 extends upwardly from the end wall 120 and defines a center opening or bore 124 to facilitate coupling between the mixing valve 44 and the valve actuator 46 through a disc retainer or carrier 126.

A mounting plate 130 is positioned above the valve housing 68. A pair of pegs 132 of the valve housing 68 may be received within openings 134 in the mounting plate 130 to prevent rotational movement therebetween. A plurality of bolts 136 pass through openings 138 in the base 76 of the valve body 66 and may be threadably received within openings 140 in the mounting plate 130 and, as such, secure the valve housing 68 to the valve body 66. As further detailed herein, an end-of-travel (EOT) sensor 142 may be supported by the valve housing 68 and is electrically coupled to the controller 50.

The flow control members 72 and 74 received within the chamber 70 of the mixing valve 44 illustratively include a movable valve member or upper disc 72 sealingly engaging a fixed valve member or lower disc 74. The lower disc 74 is supported by the base 76 of the valve body 66 and includes hot and cold water openings 146 and 148 in fluid communication with the hot and cold water inlet ports 82 and 84, respectively, of the valve body 66. The lower disc 74 also includes an outlet opening 150 in fluid communication with the outlet port 88 of the valve body 66. A gasket 152 provides a fluid seal between the lower disc 74 and the valve body 66 and may be received within opposing channels 154 and 156 formed within the base 76 of the valve body 66 and the lower surface 158 of the lower disc 74, respectively. Notches 160 are formed in the outer edge of the lower disc 74 and receive tabs 162 extending upwardly from the base 76 of the valve body 66 to rotationally locate and fix the lower disc 74 relative to the valve body 66.

The upper disc 72 includes a lower surface 164 for sealingly engaging with an upper surface 166 of the lower disc 74. A flow control recess or passageway 170 is formed in the lower surface 164 of the upper disc 72 and provides for selective fluid communication between the hot and cold water inlet ports 82, 84 and the outer port 88. More particularly, as the upper disc 72 is rotated about its center axis 172, flow from the openings 146, 148 (and therefore inlet ports 82, 84) to the outlet opening 150 (and therefore port 88) varies. The controller 50 is operably coupled to the actuator 46 and is configured to selectively provide a flow control mode of operation and a temperature control mode of operation by causing the actuator 46 to move the valve member 72 in rotation about its center axis 172.

Figure 6:
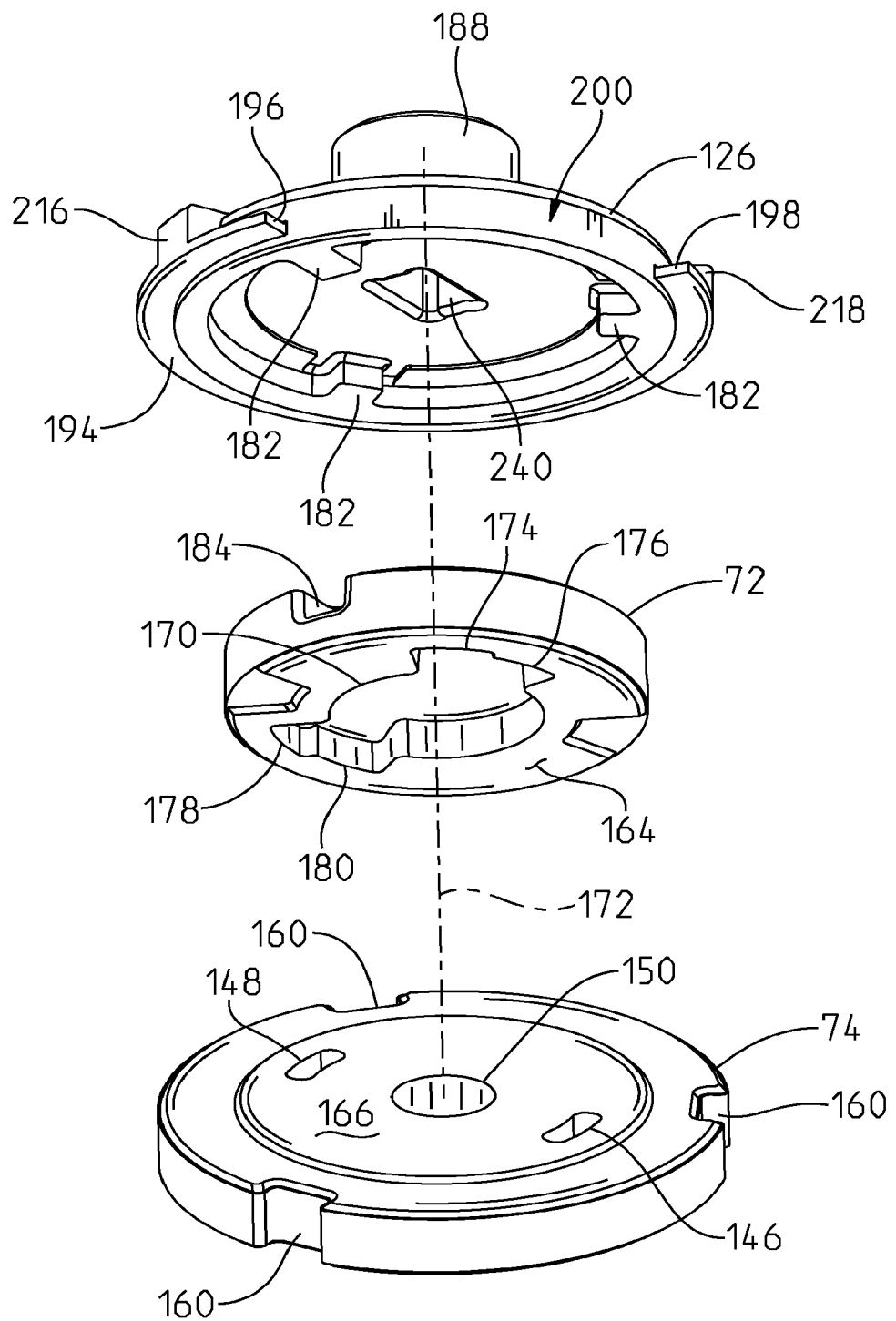
FIG. 6 is a rear exploded perspective view of flow control members and carrier of the mixing valve of FIG. 4.

With further reference to FIG. 6, the flow control recess 170 includes hot water control edges 174, 176 and cold water control edges 178, 180. As further detailed in connection with FIGS. 15A-15F, the control edges 174, 176, 178, 180 are configured to selectively overlap with the hot and cold water openings 146 and 148 of the lower disc 74 to provide (1) variable flow rates of water delivery to the outlet opening 150, and hence outlet 86, at constant temperature (i.e., flow control mode); and (2) substantially constant flow rate of water delivered to the outlet opening 150, and hence the outlet port 86, as the water temperature is varied between cold and hot temperature limits (i.e., temperature control mode). The stepped control edges 174, 176, 178, 180 maintain a substantially constant flow area to maintain the substantially constant flow rate in the temperature control mode.

The disc retainer or carrier 126 is operably coupled to the upper disc 72. More particularly, the carrier 126 includes a plurality of downwardly extending tabs 182 configured to be received within recesses 184 formed in the upper surface 186 of the upper disc 72. As such, rotation of the carrier 126 results in rotation of the upper disc 72. An upper extension 188 of the carrier 126 extends upwardly through the bore 124 of the valve housing 68. A pair of friction rings or washers 190 are received around the extension 188, intermediate an upper surface 192 of the carrier 126 and the end wall 120 of the valve housing 68.

Figure 7:
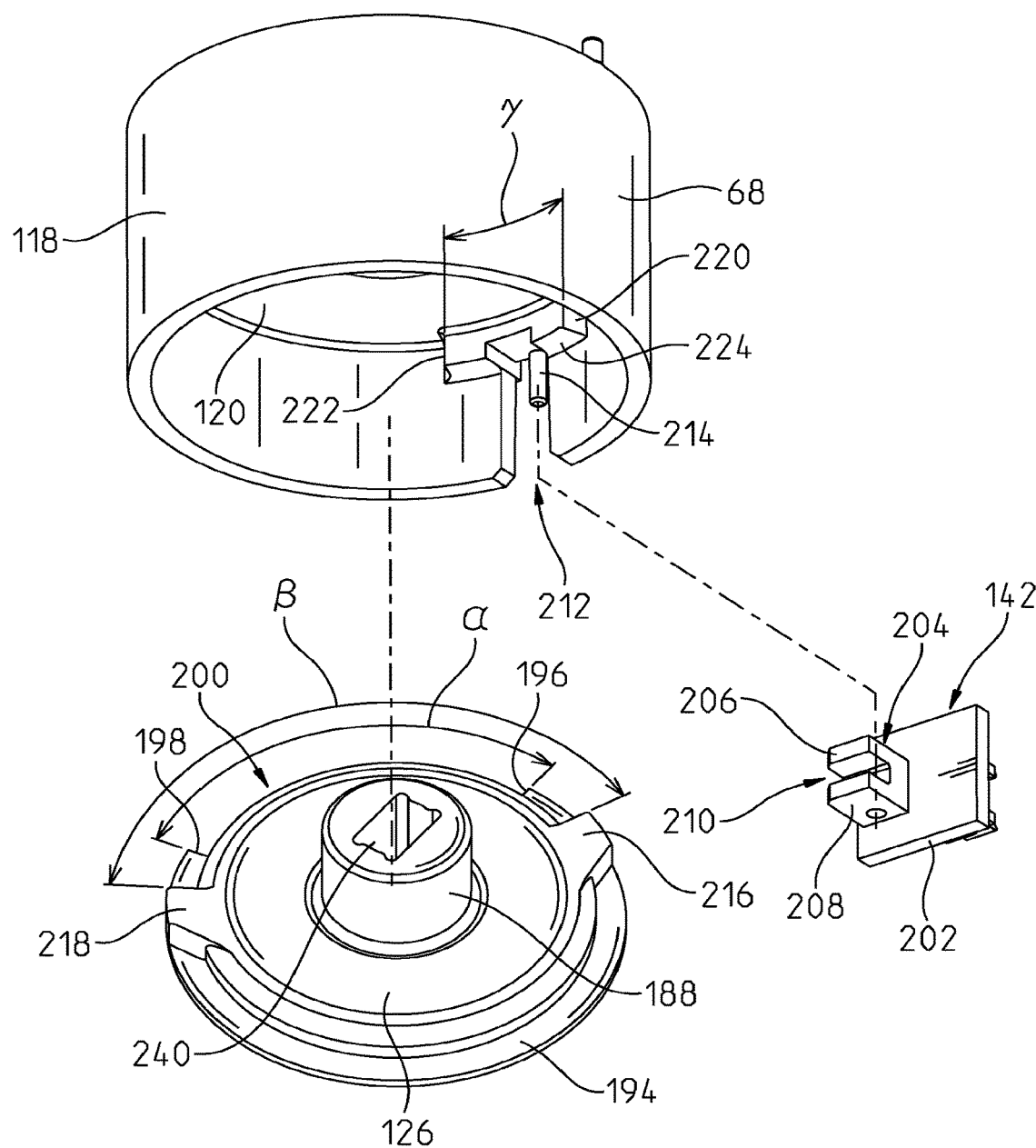
FIG. 7 is a partial exploded view showing interaction of the housing and carrier of the mixing valve.

With further reference to FIG. 7, the end-of-travel (EOT) sensor 142 is supported by the valve housing 68 and is operably coupled to the carrier 126. More particularly, the carrier 126 includes a radially outwardly extending arcuate flange 194 having opposing ends 196 and 198 defining an arcuate opening or slot 200 extending therebetween. The end-of-travel sensor 142 illustratively comprises a photo interrupter sensor including a support board 202, illustratively a printed circuit board (PCB), supporting a light emitter/detector assembly 204. The support board 202 is supported outside of the valve housing 68, while the light emitter/detector assembly 204 passes through a slot 212 formed in the sidewall 118 and is secured in place by a coupler 214, such as a pin. The arcuate slot 200 defines a maximum rotational operating range (i.e., travel) of the carrier 126 and hence, the valve disc 72. More particularly, when either end 196, 198 of the flange 194 is detected by passing within the light emitter/detector assembly 204, the controller 50 receives a signal indicative thereof and stops operation of the actuator 46. In the illustrative embodiment, the ends 196 and 198 of the flange 194 are angularly offset by a predetermined angle a, illustratively about 100 degrees. As such, the carrier 126 may be rotated by the angle a before the end-of-travel sensor before the end-of-travel sensor 142 sends an end-of-travel signal to the controller 50.

A mechanical or hard limit stop is also provided between the valve housing 68 and the carrier 126. More particularly, the carrier 126 includes stop members 216 and 218 configured to engage opposing end surfaces 220 and 222 of a limit block 224 supported by the sidewall 118 of the valve housing 68. As such, rotational movement of the carrier 126, and valve disc 72, is limited should the electronic end-of-travel sensor 142 not limit rotational movement of the carrier 126. Illustratively, the stop members 216 and 218 are angularly offset by a predetermined angle β, and the end surfaces 220 and 222 are angularly spaced by a predetermined angle γ. In the illustrative embodiment, angle β is equal to approximately 144 degrees, while angle γ is equal to approximately 40 degrees. As such, the illustrative maximum angular movement permitted by the limit stop defined by engagement between stop members 216, 218 and end surfaces 220, 222, respectively, is about 104 degrees.

The actuator 46 illustratively includes a direct current (DC) motor 230 operably coupled to a gear assembly or motor 232. The gear assembly 232 is secured to the mounting plate 130 through a plurality of screws 234. A rotatable output shaft 236 of the DC motor 230 drives an output shaft 238 of the gear assembly 232 in rotation. The output shaft 238 is received within an aperture 240 formed within the extension 188 of the carrier 126. As such, the output shaft 238 drives the carrier 126 and valve disc 72 in rotation.

A valve position sensor 242 is operably coupled to the DC motor 230 to determine the rotational position of the shaft 236, and therefore the rotational position of the valve disc 72. Illustratively, the valve position sensor 242 includes an encoder wheel 244 operably coupled with a emitter/detector assembly 246. More particularly, the wheel 244 is coupled to rotate with the shaft 236, wherein the light emitter/detector assembly 246, which includes a light emitter and a light detector, observes openings or marks on the wheel 244 and provides a signal indicative the rotational position of the motor shaft 236 and the valve disc 72 to the controller 50.

Figure 8:
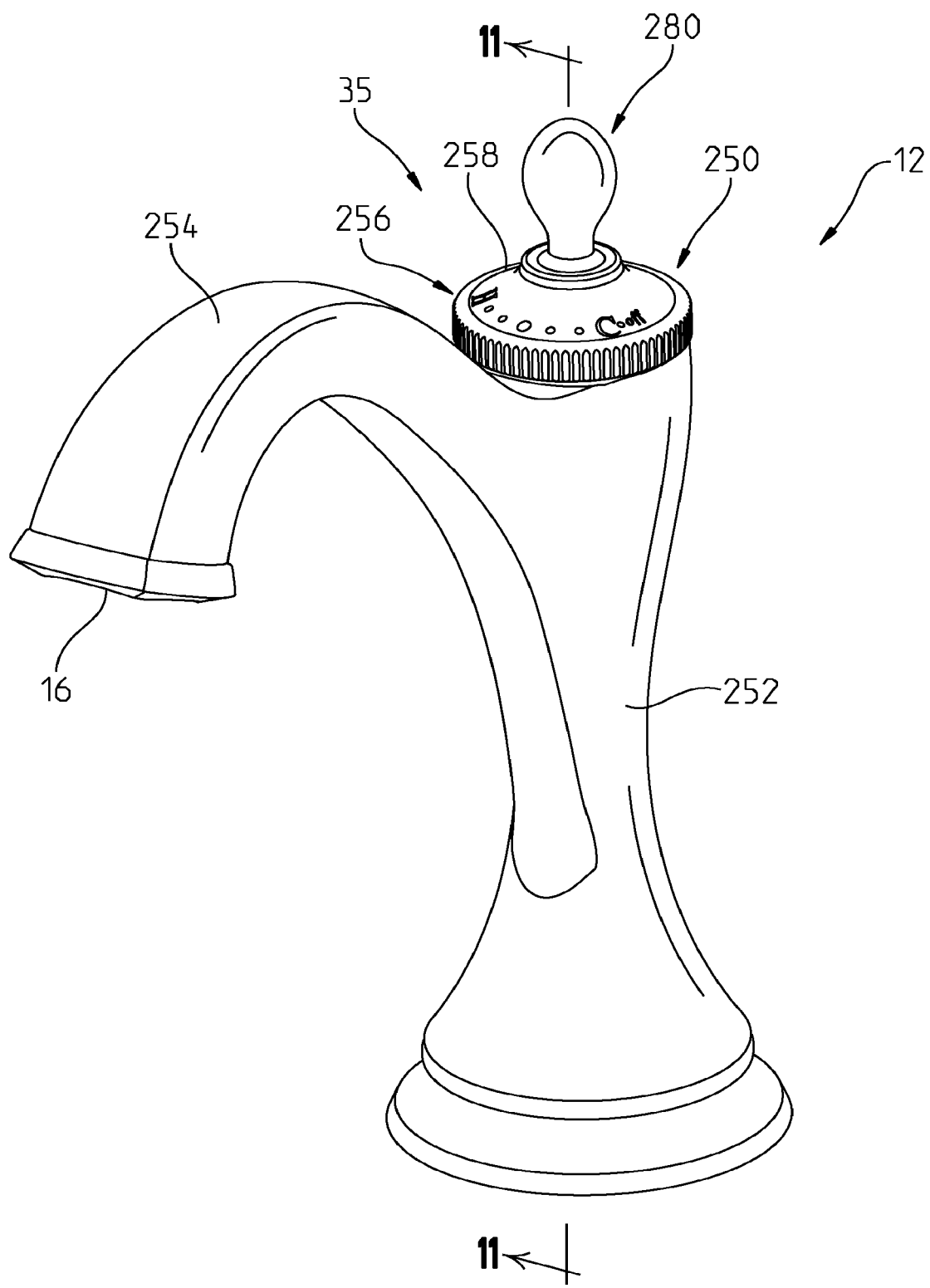
FIG. 8 is a perspective view of the delivery spout and user interface of the faucet of FIG. 1.

With reference to FIGS. 1 and 8, the electronic user interface 35 illustratively includes a first or flow user input 250 supported above the mounting deck 14, illustratively by the delivery spout 12. More particularly, the delivery spout 12 illustratively includes an upright portion 252 and an arcuate outlet portion 254. The user input 250 is illustratively supported at the upper end of the upright portion 252 and includes a rotatable member 256, illustratively a dial. Rotation of the dial 256 results in the controller 50 causing the actuator 46 to drive the valve disc 72 in rotation.

While the illustrative user input 250 is shown as a rotatable dial 256 supported by the delivery spout 12, the user input 250 may be other conventional input devices having different control configurations, such as touch buttons, slide switches, etc. for providing user input signals to the controller 50. Additionally, the user input 250 may be located with other faucet components (e.g., manual valve handle, faucet hub, etc.) or define a separate faucet component at a remote control location.

Figure 9:
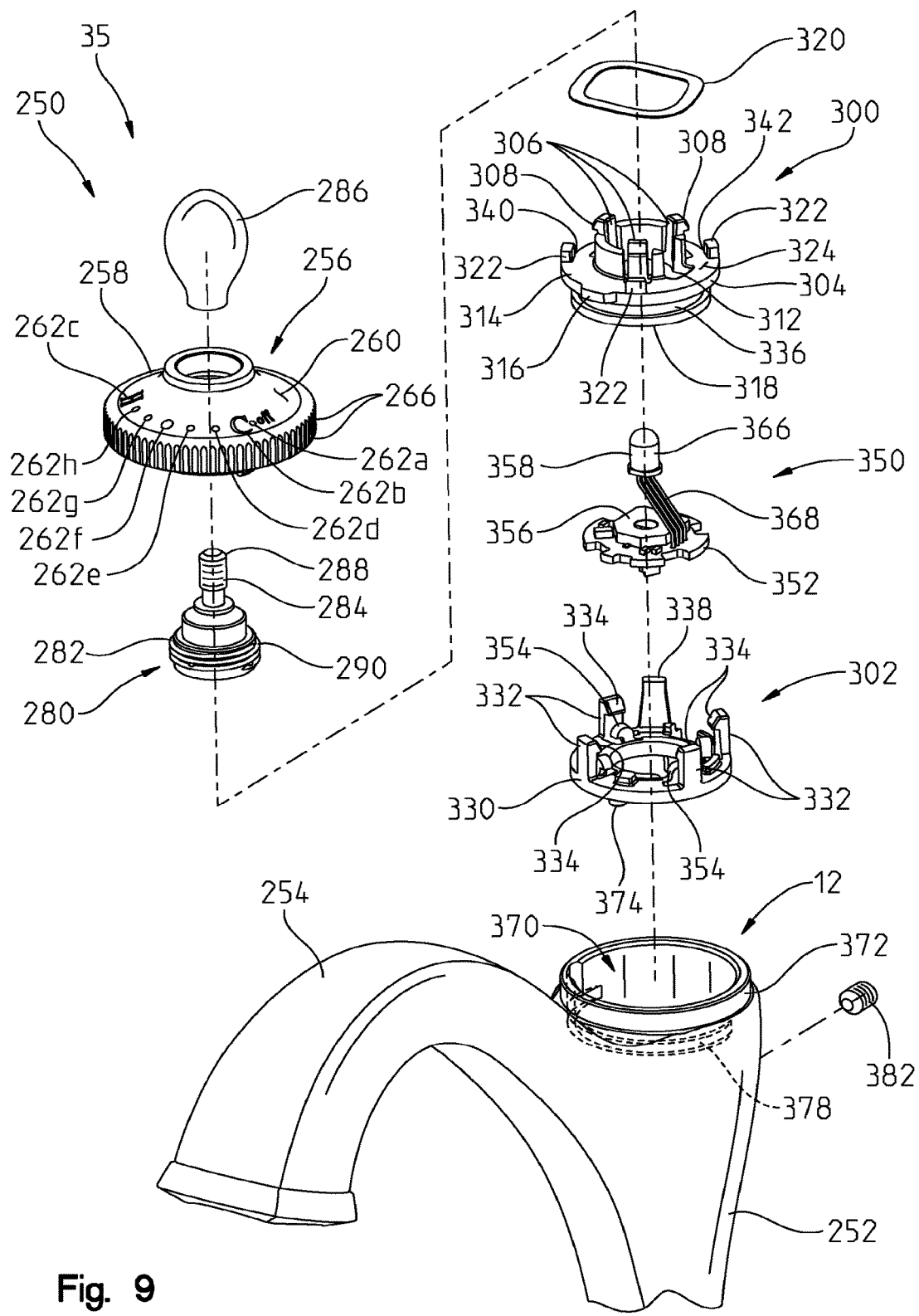
FIG. 9 is an upper exploded perspective view of the user interface of FIG. 8.
Figure 10:
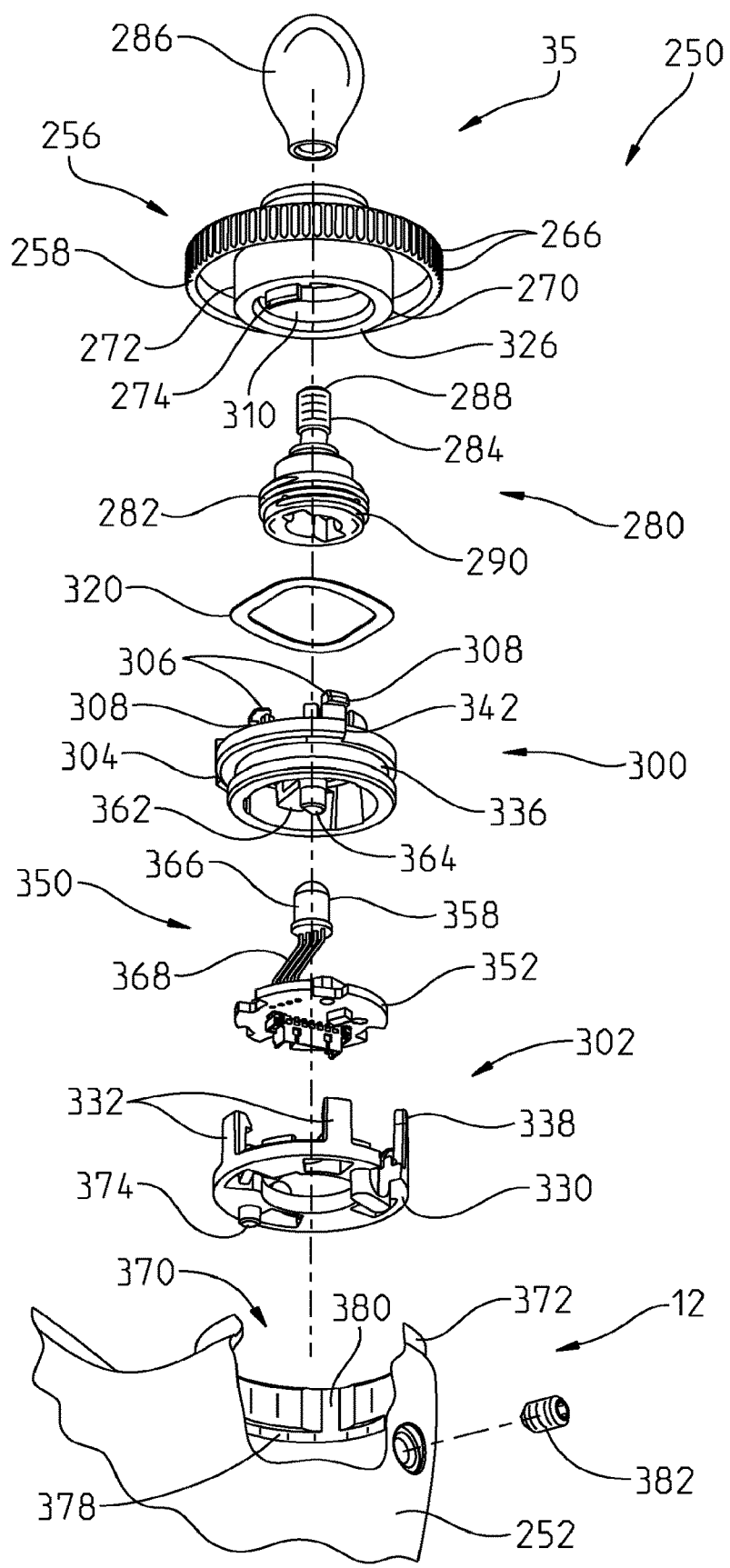
FIG. 10 is a lower exploded perspective view of the user interface of FIG. 8.
Figure 11:
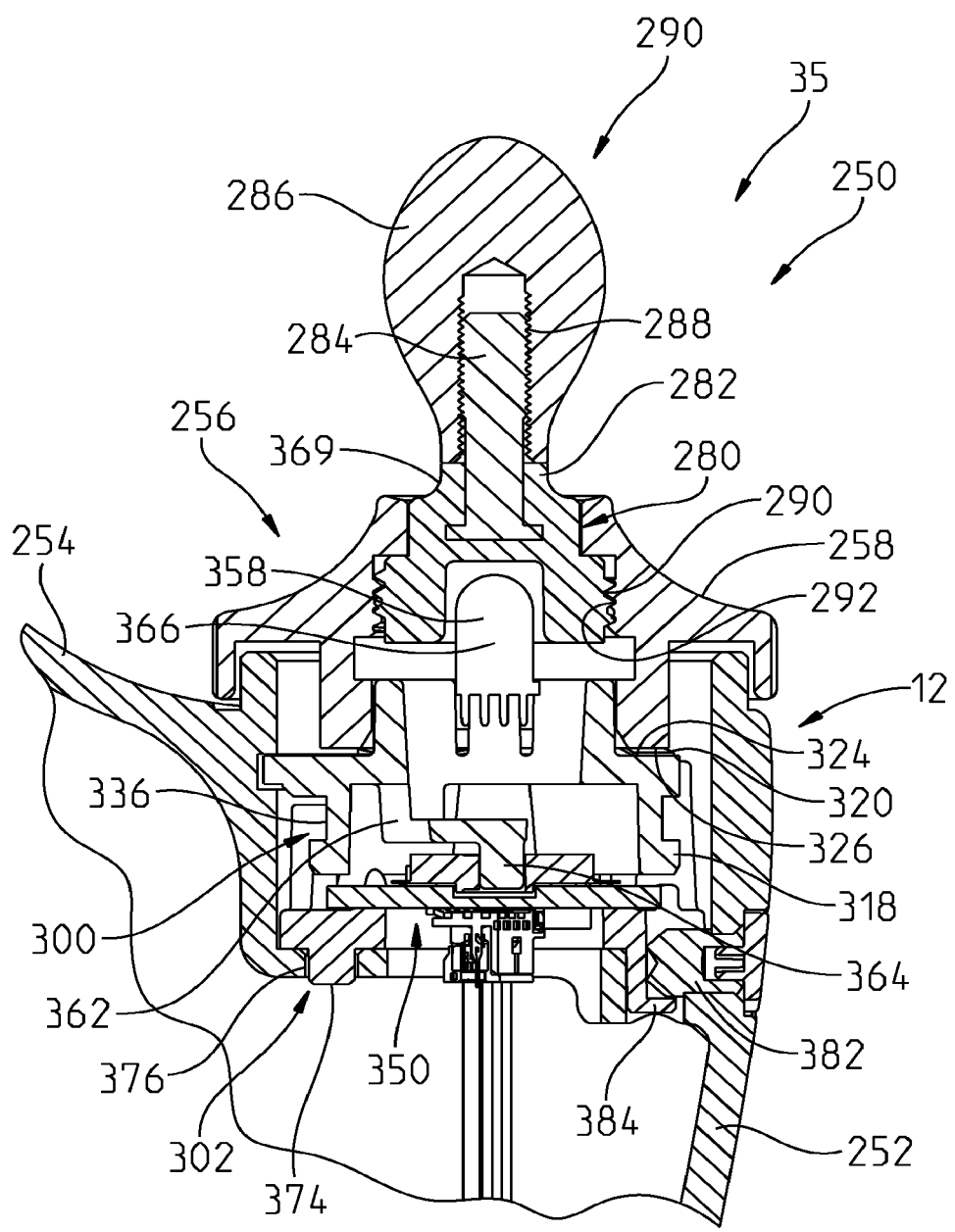
FIG. 11 is a partial cross-sectional view taken along line 11-11 of FIG. 8.

With reference to FIGS. 9-11, the dial 256 illustratively includes a base 258 including an upper surface 260 including a plurality of indicia 262 for indicating desired or setpoint water temperature. The indicia 262 may include representations for off 262a, cold water 262b, and hot water 262c. Additional indicia 262d-262h may represent temperatures intermediate cold water 262b and hot water 262c. The indicia 262 are illustratively selectively alignable with a mark 264, such as an arrow, supported by the spout 12. The base 258 includes a plurality of vertical grooves or recesses 266 to assist a user in gripping and rotating the dial 256. A coupling member 270 includes a cylindrical sidewall 272 extending downwardly from the base 258. A retaining tab 274 extends downwardly from the sidewall 272.

A stem 280 is coupled to the base 258 for rotation therewith. The stem 280 includes a lens 282 overmolded about an insert stud 284. A finial 286 threadably couples with external threads 288 of the insert stud 284 and extends upwardly form the upper surface 260 of the base 258. A lower end of the lens 282 includes threads 290 threadably received within a threaded opening 292 in a lower end of the base 258.

The dial 256 further includes a bearing member 300 coupled to a bracket 302. The bearing member 300 includes a body 304 and a plurality of resilient fingers 306 extending upwardly from the body 304. The resilient fingers 306 include radially outwardly extending tabs 308 configured to be received within an internal groove 310 formed within the coupling member 270 of the base 258. More particularly, the tabs 308 axially secure the base 258 to the bearing member 300. A recess or notch 312 is configured to receive the retaining tab 274 of the dial 256 for rotatably locating and securing the dial 256 relative to the bearing member 300. A flange 314 extends radially outwardly from the body 304 and includes a tab 316 configured to cooperate with the spout 12. A cylindrical sidewall 318 extends downwardly from the flange 314.

A biasing member 320, illustratively a wave spring, is received intermediate the bearing member 300 and the base 258. More particularly, the wave spring 320 is radially received intermediate the fingers 306 and a plurality of tabs 322, and axially intermediate an upper surface 324 of the bearing member 300 and a lower surface 326 of the base 258. The wave spring 320 biases the base 258 of the dial 256 away from the bearing member 300 to accommodate dimensional tolerances.

The bracket 302 includes a base 330 supporting a plurality of upwardly extending fingers 332 having radially inwardly extending tabs 334. The tabs 334 are received within an external annular groove 336 formed within the side wall 318 of the bearing member 300. The tabs 334 axially secure the dial 256 to the bracket 302 while permitting relative rotation therebetween. A stop member 338, illustratively a finger, extends upwardly from the base 330 and is configured to engage limit surfaces 340 and 342 supported by the flange 314 of the bearing member 300 for limiting rotational movement of the dial 256. In one illustrative embodiment, the limit surfaces 340 and 342 engage the stop member 338 to limit rotation of the dial 256 to approximately 124 degrees.

An electronics assembly 350 is positioned intermediate the bearing member 300 and the bracket 302. The electronics assembly 350 includes a support board 352, illustratively a printed circuit board (PCB), coupled to the base 330 of the bracket 302 through a plurality of latch arms 354. The support board 352 operably couples a user interface position sensor 356 and a temperature indicator 358 to the controller 50.

The user interface position sensor 356 illustratively comprises a rotary sensor 360 operably coupled to the dial 256. More particularly, the bearing member 300 includes an L-shaped arm 362 supporting a shaft 364 for transmitting rotation from the dial 256 to the rotary sensor 360. The rotary sensor 360 may be of conventional design, such as a potentiometer, for transmitting a voltage signal indicative of rotational position of the dial 256 to the controller 50.

The temperature indicator 358 is coupled to the controller 50 for providing a visual indication to a user of water temperature at the outlet 86 as measured by the temperature sensor 110. Illustratively, the temperature indicator 358 comprises a light, such as a multiple color light emitting diode (LED) 366. As further detailed herein, the temperature indicator 358 may comprise a red/blue bicolor LED 366, wherein blue light emitted by the LED 366 represents cold water as measured by the temperature sensor 110, and red light emitted by the LED 366 represents hot water as measured by the temperature sensor 110. Mixed or intermediate temperature water is illustratively represented by a blend of red and blue light emitted by the LED 366. Different water flow rates may be represented by different light intensities or magnitudes being emitted by the LED 366. For example, low flow rates selected by the user may be represented by low intensity light emitted by the LED 366, while higher flow rates selected by the user may be represented by higher intensity light emitted by the LED 366. Further, different status conditions (e.g., operating modes, low battery, etc.) of the faucet 10 may be indicated by the LED 366, for example through flashing patterns. The LED 366 is electrically coupled to the support board 352 through wires 368, while the LED 366 is positioned within the lens 282 of the stem 280. As such, light is visible within a window 369 defined intermediate the upper surface of the base 258 and the finial 286.

The bracket 302 is illustratively received within an opening 370 at the upper end of the upright portion 252 of the delivery spout 12. More particularly, a side wall or shell 372 of the spout 12 defines the opening 370 and receives the base 330 of the bracket 302. A downwardly extending peg 374 is received within a recess 376 inside the opening 370 proximate the wall 372 to assist in locating the bracket 302 relative to the spout 12. The tab 316 of the bearing member 300 extends radially outwardly from the flange 314 and is received within an arcuate slot 378 in the spout 12. More particularly, during assembly the tab 316 is moved axially downwardly through a vertical slot 380 and is then rotatable within the arcuate slot 378. A retaining or set screw 382 extends through the upright portion 252 of the spout 12 and cooperates with a lip 384 positioned downwardly from the base 330 for securing the bracket 302 to the delivery spout 12.

In certain illustrative embodiments, the electronic user interface 35 may further include a second or activation user input 390 operably coupled to the spout 12 for activating water flow through the mixing valve 44. The activation user input 390 is in electrical communication with the controller 50 for providing an additional means for activating water flow through the spout 12. While the first or flow user input 250 illustratively provides user control of water flow and temperature (through proportioning water flow between hot and cold water inlet ports 82 and 84) in the manner detailed herein (including an off or no flow position), the activation user input 390 is configured to activate and deactivate water flow based upon the user selected position or setpoint of the dial 256.

The activation user input 390 may comprise a proximity sensor, such as an infrared sensor coupled to the spout 12. In other illustrative embodiments, the activation user input 390 may comprise a capacitive sensor. The capacitive sensor 390 may function as a touch sensor and/or a proximity sensor to control activation of the mixing valve 44 in a manner similar to that disclosed in U.S. Patent Application No. 2011/0253220 to Sawaski et al., the disclosure of which is expressly incorporated by reference herein.

Figure 13:
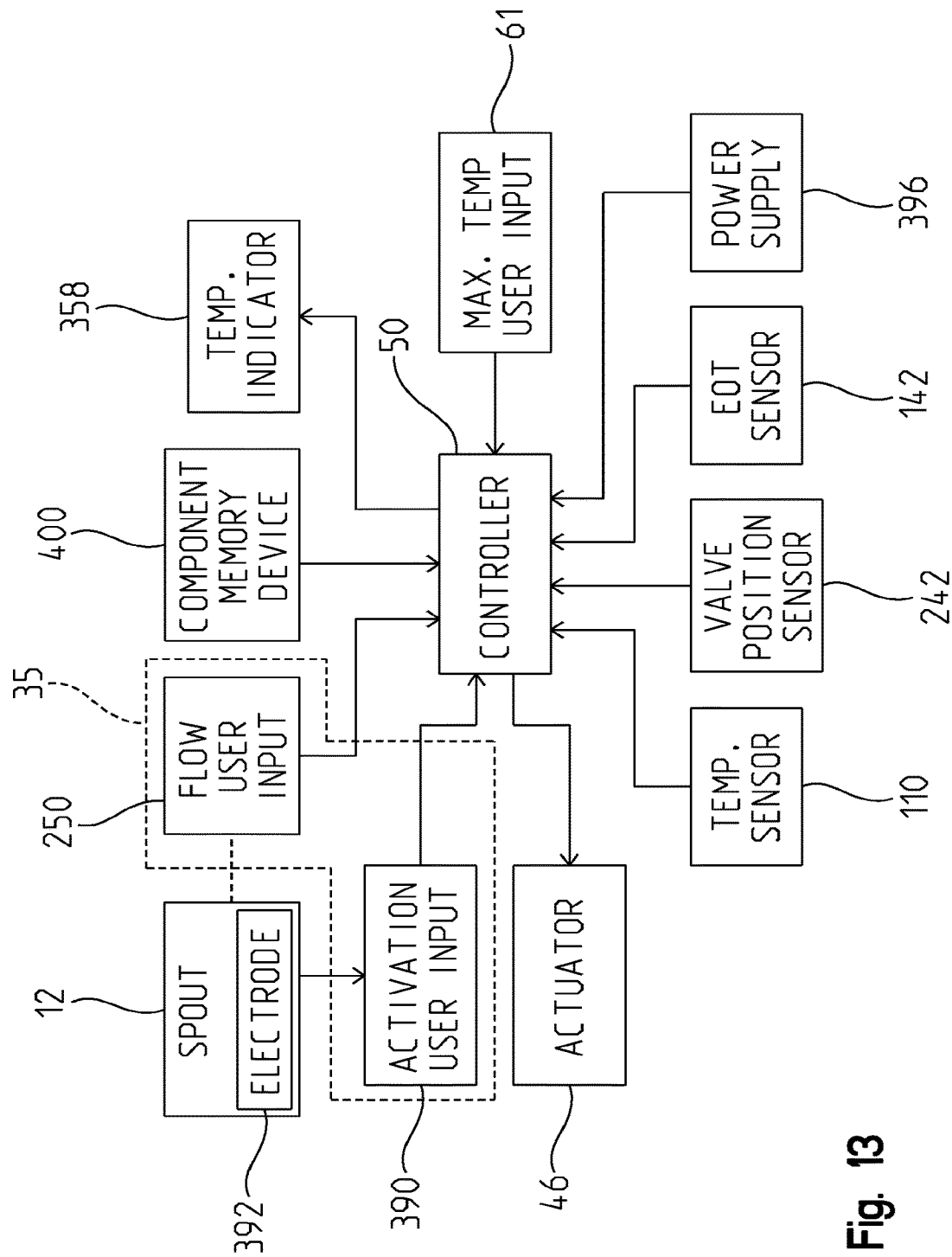
FIG. 13 is a block diagram showing interactions between various electrical components and the controller of the faucet of FIG. 1.

With reference to FIG. 13, an electrode 392 of the capacitive sensor 390 is illustratively coupled to the spout 12. The side wall or shell 372 of the spout 12 may be formed of an electrically conductive material (e.g., a metal) and define the electrode 392. In other illustrative embodiments, the electrode 392 may be defined by a separate electrically conductive element, such as a metal plate. Any suitable capacitive sensor 390 may be used, such as a CapSense capacitive sensor available from Cypress Semiconductor Corporation. An output from the capacitive sensor 390 is coupled to the controller 50. As noted above, the capacitive sensor 390 and electrode 392 may be used as both a touch sensor and a hands free proximity sensor.

By sensing capacitive changes with the capacitive sensor 390, the controller 50 can make logical decisions to control different modes of operation of the faucet 10, such as changing between a touch mode of operation and a hands free proximity mode of operation. In the touch mode of operation, the capacitive sensor 390 and controller 50 detect a user's hand or other object (e.g., user's forearm, elbow, etc.) in contact with the spout 12. In the hands free mode of operation, the capacitive sensor 390 and controller 50 detect a user's hand or other object (e.g., user's forearm, elbow, cup, etc.) within a detection zone or area (not shown) located near the spout 12.

A user may selectively enable or disable the hands free proximity mode of operation by using a series of touches of the spout 12. The electronic faucet 10 may include an indicator to provide a visual and/or audible indication when the faucet 10 is in the hands free proximity mode. Illustratively, the temperature indicator 358 may provide a visual indication by flashing the LED 366 when in an active hands free proximity mode by flashing, and by providing constant light from the LED 366 when in an active touch mode. In alternative embodiments, a mode selector switch (not shown) may be coupled to the controller 50 for selectively enabling and disabling the proximity mode.

In operation, the user may enable or disable the hands free proximity mode by using a predetermined pattern of touching the spout 12. For example, the hands free mode may be toggled on and off by twice quickly touching the spout 12, or by grasping the spout 12 for a predetermined time period. It is understood that other touching patterns may be used to turn on and off the hand free proximity mode of operation.

The controller 50 determines whether or not the hands free proximity mode is enabled. If enabled, the controller 50 monitors the capacitive signal for proximity detection. In other words, the controller 50 monitors an output from the capacitive sensor 390 to determine whether a user's hands or other object are within the detection area proximate the spout 12. If so, then the controller 50 sends a signal to open the mixing valve 44 to the setpoint position of the dial 256, while continuing to monitor the hands free proximity detection area. If the user's hands are not detected within the detection area, the controller 50 closes the valve 44 if it is open.

If the hands free proximity mode of operation is disabled, the controller 50 monitors the capacitive signal from the capacitive sensor 390 for touch detection. The controller 50 determines whether a touch (tap or grab) is detected on the spout 12. If no touch is detected, the controller 50 continue monitoring. If a touch is detected, then the controller 50 determines the touch pattern. Depending upon the length of time that the spout 12 is touched (tap or grab) and the pattern of touching (number of touches), different functions may be implemented. For example, the touch duration and patterns may activate and deactivate features such as the hands free proximity sensing on and off, or set other program features.

Figure 12:
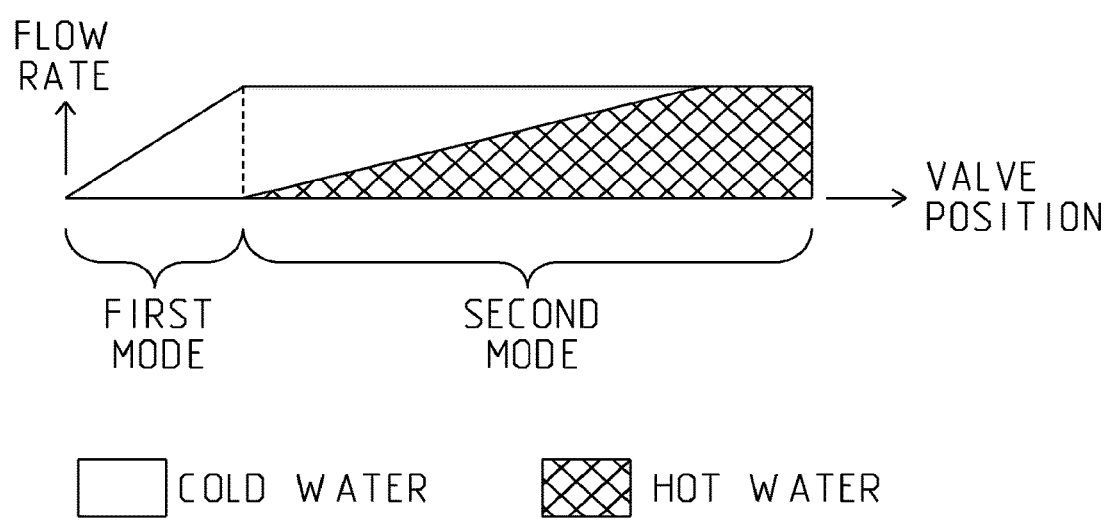
FIG. 12 is a diagrammatic view showing constant temperature, variable flow control in a first mode, and variable temperature and constant flow control in a second mode.

With reference now to FIGS. 12 and 13, interaction between the controller 50, user interface 35, and valve position sensor 242 will be further detailed for providing the flow control and temperature control modes of operation of the mixing valve 44.

FIG. 12 is a diagrammatic representation of flow rate (Q) at the outlet vs. rotational position (P) of the valve member in a first, or flow control mode of operation, and in a second, or temperature control mode of operation. In FIG. 12, the x-axis represents the rotational position of the valve disc 72, and the y-axis represents flow rate. Relative flow rates of cold water and hot water are represented by different shaded areas.

In the first, or flow control mode of operation, the controller 50 illustratively causes clockwise rotation of the valve disc 72 within a first angular range (illustratively 0 to 40 degrees). As the rotational position of the valve disc 72 increases within the first angular range, the flow rate of water supplied to spout 12 through the outlet 86 increases, while the water temperature remains substantially constant (at the minimum temperature or cold water limit). In other words, in the first mode, the rotational positions of the valve disc 72 are associated with setpoint water flow rates determined by the rotational position of the dial 256.

In the second, or temperature control mode of operation, the controller 50 illustratively causes further clockwise rotation of the valve disc 72 within a second angular range (illustratively 40 to 100 degrees). As the rotational position of the valve disc 72 increases within the second angular range, the temperature of water (i.e., the mix ratio of hot water to cold water) supplied to the spout 12 through the outlet 86 increases, while the flow rate of the water remains substantially constant. In other words, in the second mode, the rotational positions of the valve disc 72 are associated with setpoint water temperatures determined by the rotational position of the dial 256.

FIG. 13 is a block diagram showing various electronic components in electrical communication with the controller 50. A power supply 396, such as a building power supply and/or a battery power supply, is electrically coupled to the controller 50. Inputs to the controller 50 illustratively include signals from the end-of-travel senor 142, the maximum temperature user input 61, the valve position sensor 242, the temperature sensor 110, and the user interface 35, which may include the flow user input 250 and the activation user input 390. As further detailed herein, additional information may be provided to the controller 50 from a memory device 400 supported by a faucet component, illustratively the spout 12, positioned above the mounting deck 14. Outputs from the controller 50 illustratively include signals to the actuator 46 and the temperature indicator 358.

Illustrative operation of the faucet 10 will now be described with reference to FIGS. 14A-15F. FIGS. 14A-14F show different rotational positions of the dial 256 of the flow user input 250. FIGS. 15A-15F show different rotational positions of the valve disc 72 associated with the dial 256 positions of FIGS. 14A-14F. As described above in connection with FIG. 12, the controller 50 provides incremental water flow rate control (with constant water temperature) by associating rotational positions of the valve disc 72 with a selected one of a plurality of setpoint flow rates determined by the rotational position of the dial 256. The controller 50 also provides incremental water temperature control within a predetermined temperature range (with constant water flow rate) by associating rotational position of the valve disc 72 with a selected one of a plurality of setpoint temperatures determined by the angular position of the dial 256.

The setpoint temperatures within a predetermined range (illustratively the second angular range described above) are linearized between a cold water temperature limit and a hot temperature limit. Illustratively, the cold water temperature limit is the temperature of the water supplied from the cold water inlet as measured by the temperature sensor 110, while the hot water temperature limit is the water temperature set by the maximum temperature user input 61. The controller 50 causes the actuator to move the valve disc 72 to a predicted position based upon the selected setpoint temperature, and adjusts the position of the valve disc 72 based upon measured temperature feedback from the temperature sensor 110.

FIGS. 14A and 15A represent the faucet 10 in an off mode. More particularly, the dial 256 is shown in 14A in a home position rotated to its furthest most clockwise position (as set by engagement between the stop member 338 and limit surface 340 of the bearing member 300). The rotary sensor 360 provides a signal to the controller 50 of the rotational position of the dial 256. In response, the controller 50 positions the valve disc 72 as shown in FIG. 15A. More particularly, the valve disc 72 blocks flow through both the hot water and cold water inlet openings 146 and 148 such that no water flows through the flow control recess 170 to the outlet opening 150 and outlet 86. In other words, neither the hot water inlet opening 146 nor the cold water inlet opening 148 of the lower disc 74 are in fluid communication with the flow control recess 170 of the upper disc 72. In this state, the LED 366 of temperature indicator 358 is not illuminated.

FIGS. 14B and 15B represent the faucet 10 in a cold water, low flow position within the flow control mode. This position is illustratively set when the dial 256 is rotated approximately 10 degrees in a counterclockwise direction from the position shown in FIG. 14A. The rotary sensor 360 provides a signal to the controller 50 of the rotational position of the dial 256. In response, the controller 50 positions the valve disc 72 as shown in FIG. 15B. More particularly, the valve disc 72 continues to block flow through the hot water inlet opening 146, while permitting limited water flow through the cold water inlet opening 148. The outer control edge 178 of the flow control recess 170 in the valve disc 72 overlaps approximately $\frac{1}{3}^{rd}$ of the cold water inlet opening 148. As such, cold water passes from cold water inlet 80, through cold water inlet opening 148 and flow control recess 170, to outlet opening 150 and outlet 86. In this state, the LED 366 of temperature indicator 358 provides a dim (e.g., 33% full illumination) blue light.

Figures 14C, 14D:
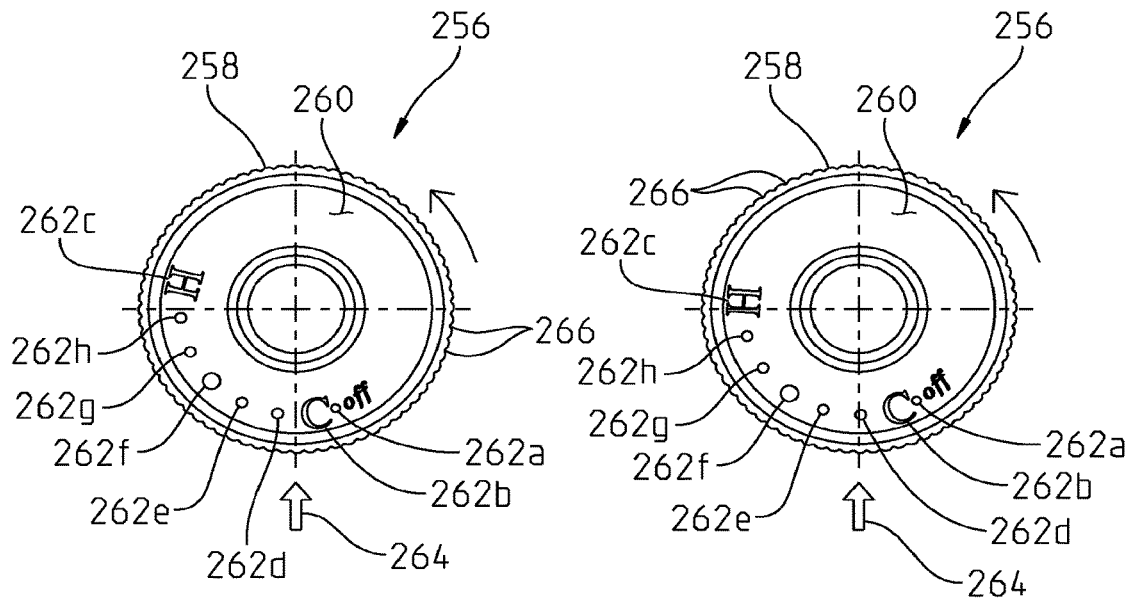
Figures 15C, 15D:
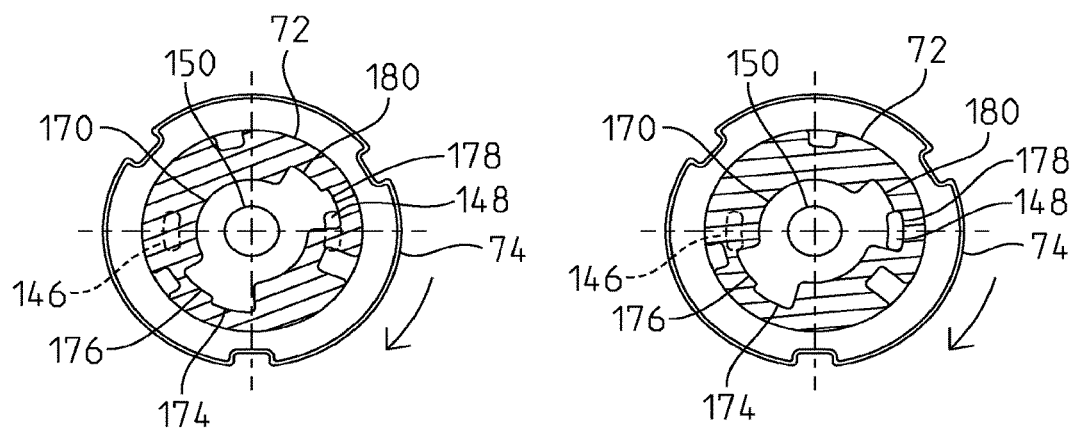

FIGS. 14C and 15C represent the faucet 10 in a cold water, intermediate flow position within the flow control mode. This position is illustratively set when the dial 256 is rotated approximately 20 degrees in a counterclockwise direction from the position shown in FIG. 14A. The rotary sensor 360 provides a signal to the controller 50 of the rotational position of the dial 256. In response, the controller 50 positions the valve disc 72 as shown in FIG. 15C. More particularly, the valve disc 72 continues to block flow through the hot water inlet opening 146, while permitting limited water flow through the cold water inlet opening 148. The outer control edge 178 of the control recess 170 in the valve disc 72 overlaps approximately $\frac{2}{3}^{rd}$ of the cold water inlet opening 148. As such, cold water passes from cold water inlet 80, through cold water inlet opening 148 and flow control recess 170, to outlet opening 150 and outlet 86. In this state, the LED 366 of temperature indicator 358 provides an intermediate (e.g., 66% full illumination) blue light.

FIGS. 14D and 15D represent the faucet 10 in a cold water, full flow position. This is illustratively the transition point between the flow control mode and the temperature control mode. The cold water, full flow position provides the maximum flow rate at the minimum temperature to the outlet 86. This position is illustratively set when the dial 256 is rotated approximately 30 degrees in a counterclockwise direction from the position shown in FIG. 14A. The rotary sensor 360 provides a signal to the controller 50 of the rotational position of the dial 256. In response, the controller 50 positions the valve disc 72 as shown in FIG. 15D. More particularly, the valve disc 72 continues to block flow through the hot water inlet opening 146, while permitting full water flow through the cold water inlet opening 148. The outer control edge 178 of the control recess 170 in the valve disc 72 fully overlaps the cold water inlet opening 148. As such, cold water passes from cold water inlet 80, through cold water inlet opening 148 and flow control recess 170, to outlet opening 150 and outlet 86. In this state, the LED 366 of temperature indicator 358 provides a full (e.g., 100% illumination) blue light.

Figure 14E:
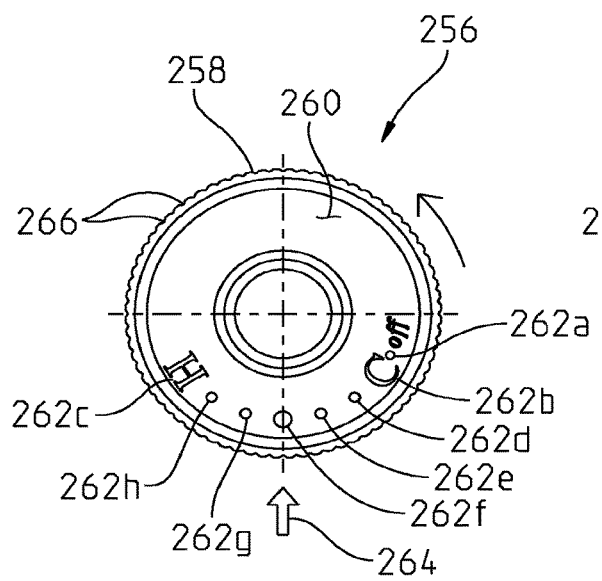
Figure 15E:
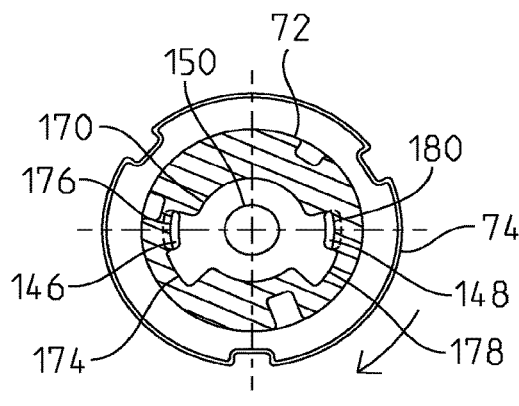

FIGS. 14E and 15E represent the faucet 10 in a mixed water, full flow position within the temperature control mode. This position is illustratively set when the dial 256 is rotated approximately 67 degrees in a counterclockwise direction from the position shown in FIG. 14A. The rotary sensor 360 provides a signal to the controller 50 of the rotational position of the dial 256. In response, the controller 50 positions the valve disc 72 as shown in FIG. 15E. More particularly, the valve disc 72 permits equal flow through the hot water inlet opening 146 and the cold water inlet opening 148. The inner control edges 176, 180 of the control recess 170 in the valve disc 72 overlap equal portions of the hot water inlet opening 146 and the cold water inlet opening 148, respectively. As such, cold water passes from cold water inlet 80, through cold water inlet opening 148 and flow control recess 170, to outlet opening 150 and outlet 86. Simultaneously, hot water passes from hot water inlet 78, through hot water inlet opening 146 and flow control recess 170 (where it mixes with cold water from cold water inlet opening 148), to outlet opening 150 and outlet 86. In this state, the LED 366 of temperature indicator 358 provides a full mix of blue and red light (e.g., 50% blue light and 50% red light at full illumination).

Figure 14F:
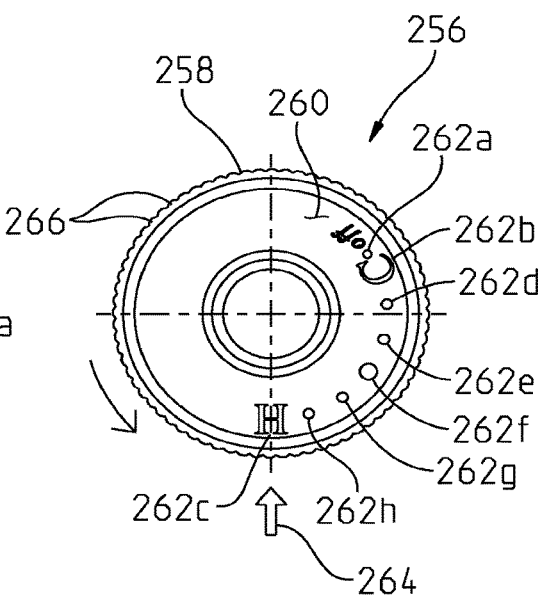
Figure 15F:
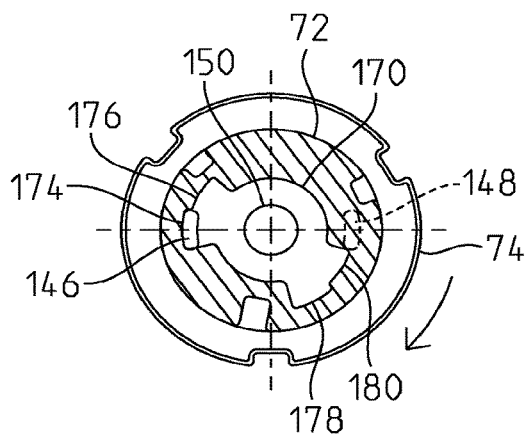

FIGS. 14F and 15F represent the faucet 10 in a hot water, full flow position. The hot water, full flow position provides the maximum flow rate at the maximum temperature to the outlet 86. This position is illustratively set when the dial 256 is rotated approximately 124 degrees in a counterclockwise direction from the position shown in FIG. 14A. The rotary sensor 360 provides a signal to the controller 50 of the rotational position of the dial 256. In response, the controller 50 positions the valve disc 72 as shown in FIG. 15F. More particularly, the valve disc 72 blocks flow through the cold water inlet opening 148, while permitting full water flow through the hot water inlet opening 146. The outer control edge 174 of the control recess 170 in the valve disc 72 fully overlaps the hot water inlet opening 146. As such, hot water passes from hot water inlet 78, through hot water inlet opening 146 and flow control recess 170, to outlet opening 150 and outlet 86. In this state, the LED 366 of temperature indicator 358 provides a full (e.g., 100% illumination) red light.

The inner control edges 176, 180 and outer control edges 174, 176 are dimensioned such that the flow control recess 170 provides a substantially constant flow rate to water supplied to outlet opening 150 as the valve disc 72 rotates between the cold water, full flow position (FIG. 15D), the mixed water, full flow position (FIG. 15E), and the hot water, full flow position (FIG. 15F).

Figure 16:
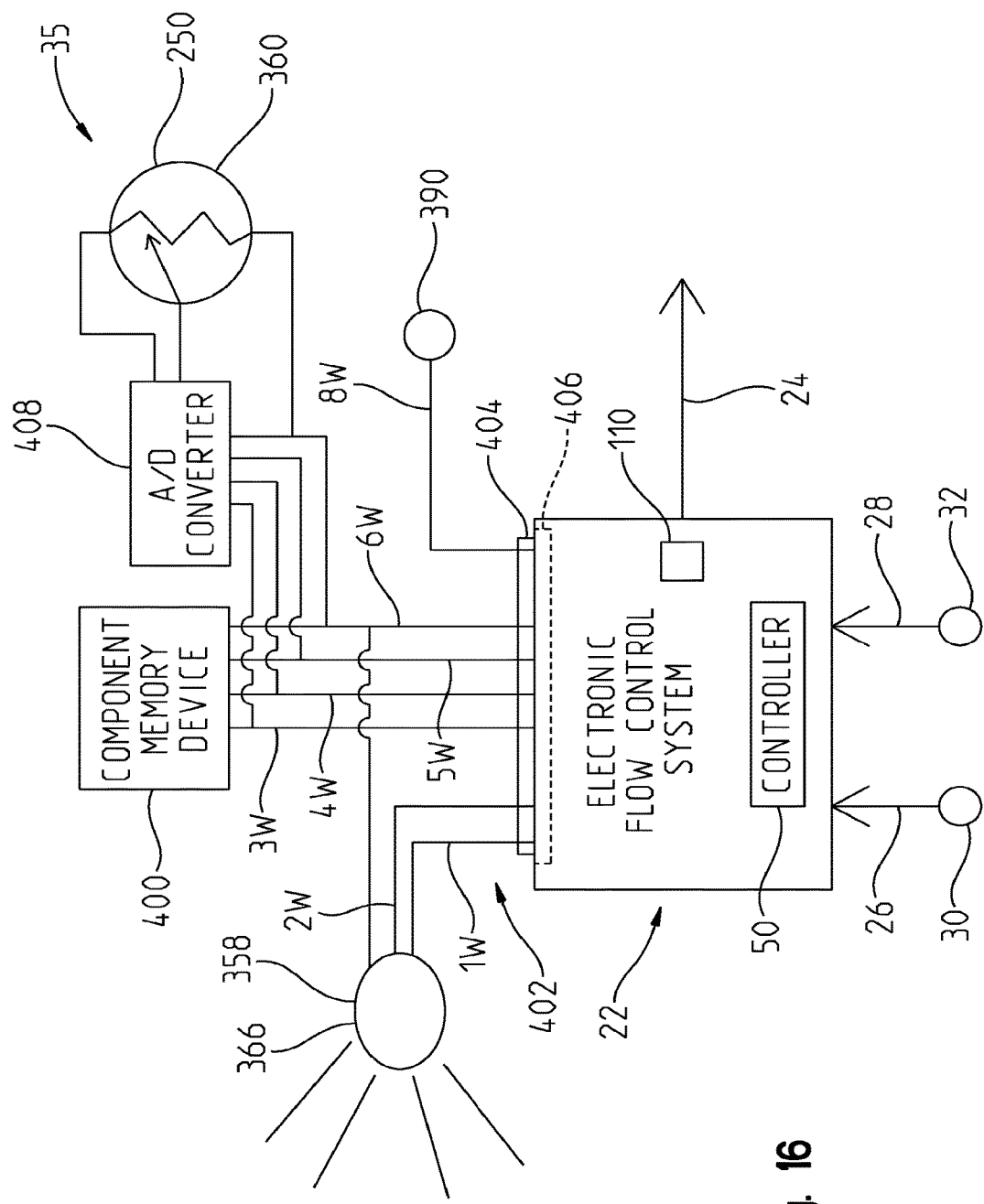
FIG. 16 is a diagrammatic representation of various control components in a first illustrative embodiment faucet.
Figure 17:
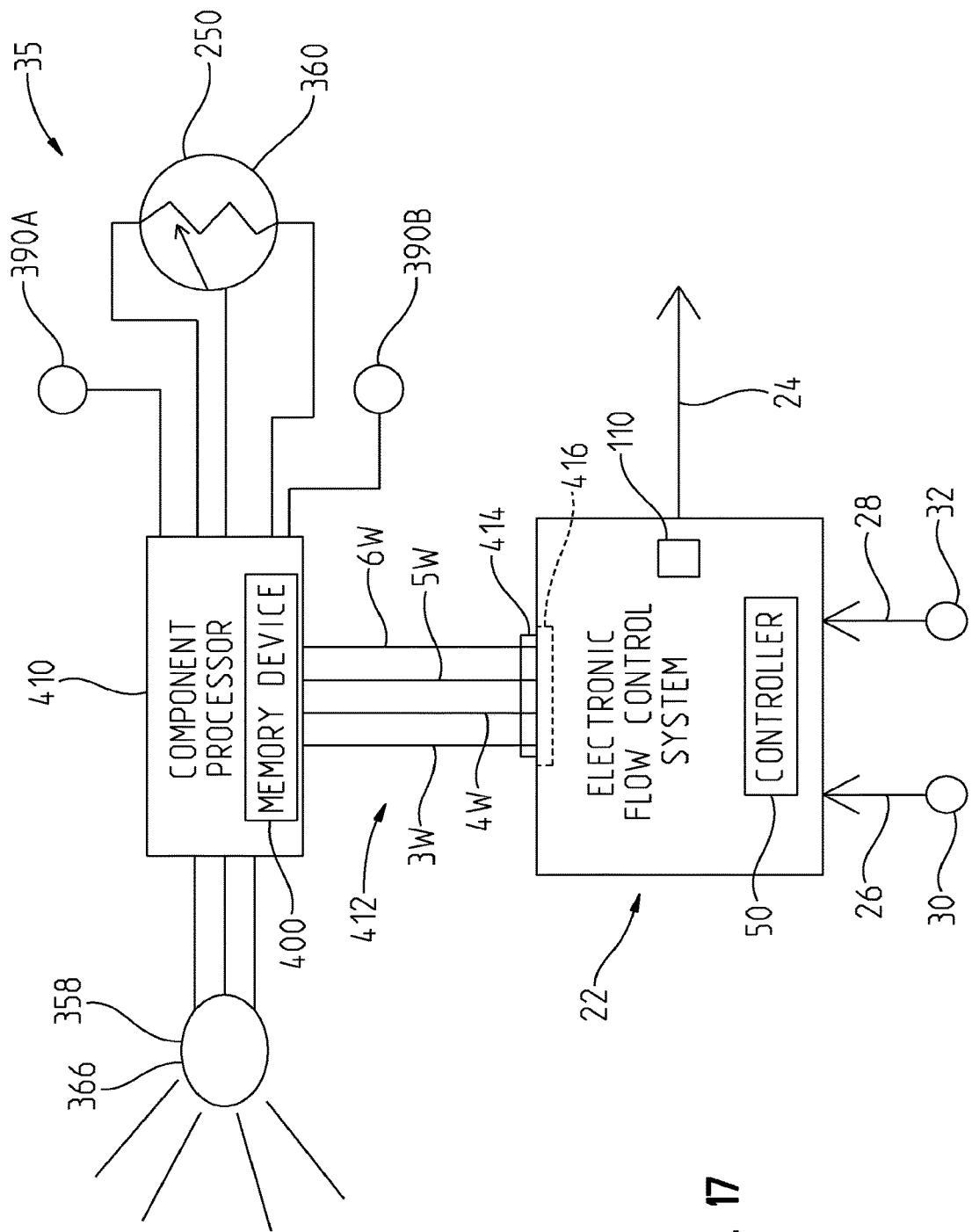
FIG. 17 is a diagrammatic representation of various control components in a second illustrative embodiment faucet.

With reference now to FIGS. 16 and 17, an identification device, illustratively a storage device or faucet component memory device 400, may facilitate the use of interchangeable components with the electronic faucet 10. For example, the faucet component memory device 400 allows the use of a single electronic flow control system 22, including an electronic proportioning valve (EPV)(including mixing valve 44, valve actuator 46, and controller 50), with different user input devices or interfaces 35 at remote locations. In one illustrative embodiment, the memory device 400 is associated with and secured to the user interface 35 above the deck 14 and communicates with controller 50 to allow for control of electronic components, such as the valve actuator 46 positioned below the mounting deck 14, from a remote control location. As further detailed herein, different memory devices 400 may be associated with different faucet components, including different user interfaces 35 and mixing valves 44.

In the illustrative embodiment, the faucet component memory device 400 is in electrical communication with the controller 50 for identifying its associated faucet component. In response, the controller 50 establishes a corresponding control configuration of the faucet component (e.g., user interface 35). In the following description, the faucet component may be referred to as the user interface 35 for illustrative purposes. However, it should be appreciated that the faucet component associated with memory device 400 may include other parts of electronic faucet 10, such as the delivery spout 12 or the mixing valve 44.

The controller 50 of the electronic flow control system 22 allows for electronic control of the mixing valve 44 located below the sink deck 14 from user interface 35 at a remote control location, illustratively above the sink deck 14. The user interface 35 may be co-located with any other faucet component (e.g., the delivery spout 12) or may define on its own a faucet component in a separate location. The user interface 35 may include a variety of input devices such as the potentiometer 360 defining flow user input 250, or capacitive sensor defining activation user input 390.

As shown in FIG. 17, the user interface 35 may also be more sophisticated and contain an internal processor 410 that interprets inputs from various sources and outputs an electrical signal to the controller 50 of the electronic flow control system 22. There are a number of potential variables even between different versions of same configuration or type of faucet component. For example, similar user interfaces 35 may include different travel limits on potentiometer 360 or different activation threshold levels for capacitive sensor 390.

A protocol is provided for communication between the user interface 35 and the controller 50 such that electronic flow control systems 22, including controllers 50, may be standardized for use with different user interfaces 35. This standard system 22 may be universally compatible with all of the faucet component configurations (e.g., spouts, manual valve handles, faucet hubs, etc.) available and allow for new faucet component configurations to be added while retaining older programming instructions of controller 50. The adaptation to various user interface configurations may occur automatically (e.g., during a faucet initialization or start-up routine) and not require additional input from the installer. The size and cost of hardware required for the remote user interface identification is considered nominal.

Figure 18:
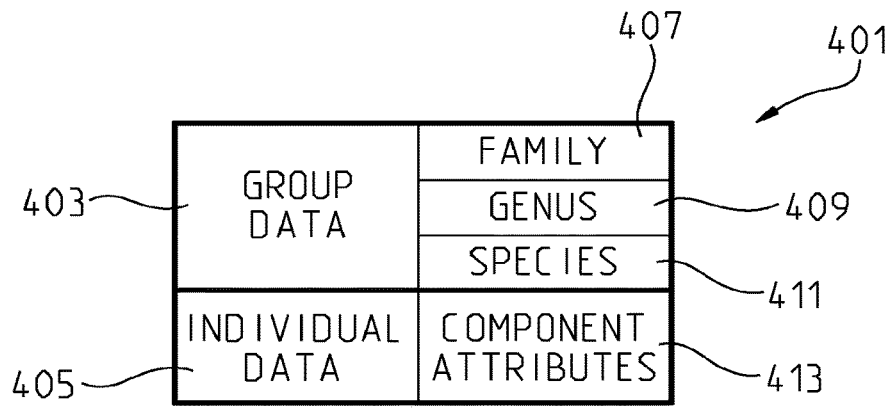
FIG. 18 is a diagrammatic representation of illustrative identification data components stored on a memory device.

With reference to FIG. 18, identification (ID) data or information 401 (e.g., an identifying number) is electronically stored in the memory device 400 of the respective faucet component. For example, the identification information 401 may include group data 403 and individual data 405. The group data 403 illustratively includes generic component information, such as family data 407, genus data 409, and species data 411. For example, family data 407 may be a certain collection of faucet components (e.g., "contemporary" faucet suite), genus data 409 may be a subset of the family data 407 (e.g., centerset or wide spread faucet of the faucet suite), and species data 411 may be a particular type of component of the identified genus (e.g., valve 44 or user interface 35). Individual data 405 is illustratively information unique to the particular component or part. In other words, individual data 405 is representative of component attributes (unique for that particular component or part). The individual data 405 may be established and stored in the memory device 400 at the factory during a calibration process at assembly, where component attributes are determined.

The identification data 401 allows the controller 50 to detect connected faucet components and determine the appropriate control configuration for those detected faucet components. In an illustrative embodiment, the identification data 401 may be representative of a control configuration of a user interface 35 as defined by the controller 50. When a connection is made through a communication cable 402, the controller 50 queries the memory device 400 about the configuration of the user interface 35 over a serial link. Based on the feedback, a particular program, or set of instructions, is selected from an internal memory of the electronic flow control system 22 by the controller 50 to control the valve actuator 46, and therefore the mixing valve 44 and resulting parameters (e.g., flow rate and/or temperature) of water supplied to the outlet 16. The program of controller 50 may receive simple input from the remote control user interface 35, such as the voltage value from potentiometer 360 and capacitive sense input from capacitor 390. This input from the user interface 35 may then be computed by controller 50 into the required position for the valve disc 72 desired outlet water flow rate, temperature, and/or faucet activation status (i.e., on or off).

The controller 50 of valve disc 72 may also output signals to the LED 366 for providing the appropriate color to the user interface 35, and thereby providing a user indication of water temperature and/or status of valve 44. In an alternative embodiment, the user interface 35 may include a processor that takes inputs from various user inputs and converts them to a direct control signal to the controller 50. The outputs, such as LEDs, would be handled directly over a serial link.

The connection between the controller 50 of the electronic flow control system 22 and the user interface 35 may be provided over a standard 4 or 8 wire cable 402 having a first end connected to the user interface 35, and having a second end connected to a connector 404, illustratively an 8 pin RJ45 plug. A corresponding connector 406, illustratively an RJ45 socket, is supported by the electronic flow control system 22. A representative wire configuration of cable 402 is shown below:

| Wire Number | Wire Color | Function |
| --- | --- | --- |
| 1W | Brown | Red LED |
| 2W | Blue | Blue LED |
| 3W | Yellow | I2C Data |
| 4W | Green | 3.3 V Switched |
| 5W | Red | Ground |
| 6W | Black | I2C Clock |
| 7W | Orange | Open |
| 8W | Slate | Capacitive Sense |

In the configuration of FIG. 16, the memory device 400 comprises a non-volatile memory, illustratively an Electrically Erasable Programmable Read-Only Memory (EEPROM) on a printed circuit board (PCB) that stores information about the upper faucet component (e.g., the user interface 35 coupled to the spout 12). The PCB is illustratively fixed to spout 12 through conventional means, such as adhesives or fasteners. Identification data or information 401 stored within memory device 400 illustratively includes a component ID number that may contain representative family data 407, genus data 409, and species data 411. Other information 401 stored in the memory device 400 may include characteristics of the individual user interface 35 (i.e., individual data 405), including factory determined calibration data. For example, memory device 400 may store limits of travel for potentiometer 360 that measures rotation of dial 256. The limits allow for the dial 256 to be individually configured, allowing a single controller 50 program to be used for dials 256 that have different ranges of rotation. This also allows for compensation of locational tolerances in the potentiometer 360 and the valve actuator 46 and mixing valve 44.

The memory device 400 illustratively communicates with the electronic flow control system 22 over a serial bus, such as an inter-integrated (I2C) serial interface, using a power, ground, clock and data port. These correspond to wires 3W-6W on the standard chart above. The analog signal from the potentiometer 360 is converted to a digital signal using an analog to digital (A/D) converter or chip 408 that outputs a serial signal over the I2C data ports. Converting the analog to digital simplifies the connection between the user interface 35 and the electronic flow control system 22 and eliminates analog signal changes due to wire resistance between the electronic flow control system 22 and the user interface 35. In addition, other interfaces, such as voltage input or external digital inputs may be readily substituted for potentiometer 360. For simple arrangements of the type shown in FIG. 16, the capacitive sense input 390 is conducted directly along wire number 8W to the controller 50 in the electronic flow control system 22 for analysis. The output for the LED indicator 366 is transmitted over wires 1W and 2W. Note that the LED 366 share a ground with I2C to reduce the wiring complexity, leaving wire 7W open for future expansion.

Another illustrative remote control/spout configuration is shown in FIG. 17 as including a digital processor 410 fixed to the faucet component (e.g., spout 12) and including internal faucet component memory device 400. When the controller 50 of the electronic flow control system 22 queries the processor 410 for configuration, the processor 410 indicates that it is a "smart" interface and the processor 410 loads the appropriate program from memory device 400. The spout processor 410 monitors various inputs (capacitive, resistive or otherwise) and interprets them in the desired user outcome. This information is transmitted back to the controller 50 over the I2C ports (wires 3W-6W). Feedback from the controller 50 may also be transmitted over the I2C ports, which the processor 410 converts into outputs (i.e., LED 366). Since the smart spout 12 of FIG. 17 only uses the I2C interface, wires 1W, 2W, 7W, and 8W are not needed and could be eliminated from the cable 412 (a 4 wire cable would use the 4 center RJ45 slots). This would reduce the wire size, allowing for smaller spouts/remote controls.

The storage of identification data 401 on the memory device 400 secured to the faucet component (e.g. spout 12 or remote control), and resulting configuration information determined by the controller 50, allows for the use a single electronic flow control system 22 for various faucet components, including different user interfaces 35 and input means. The conversion of the input signal to a digital format minimizes errors in transmission to the electronic flow control system 22.

Figure 19:
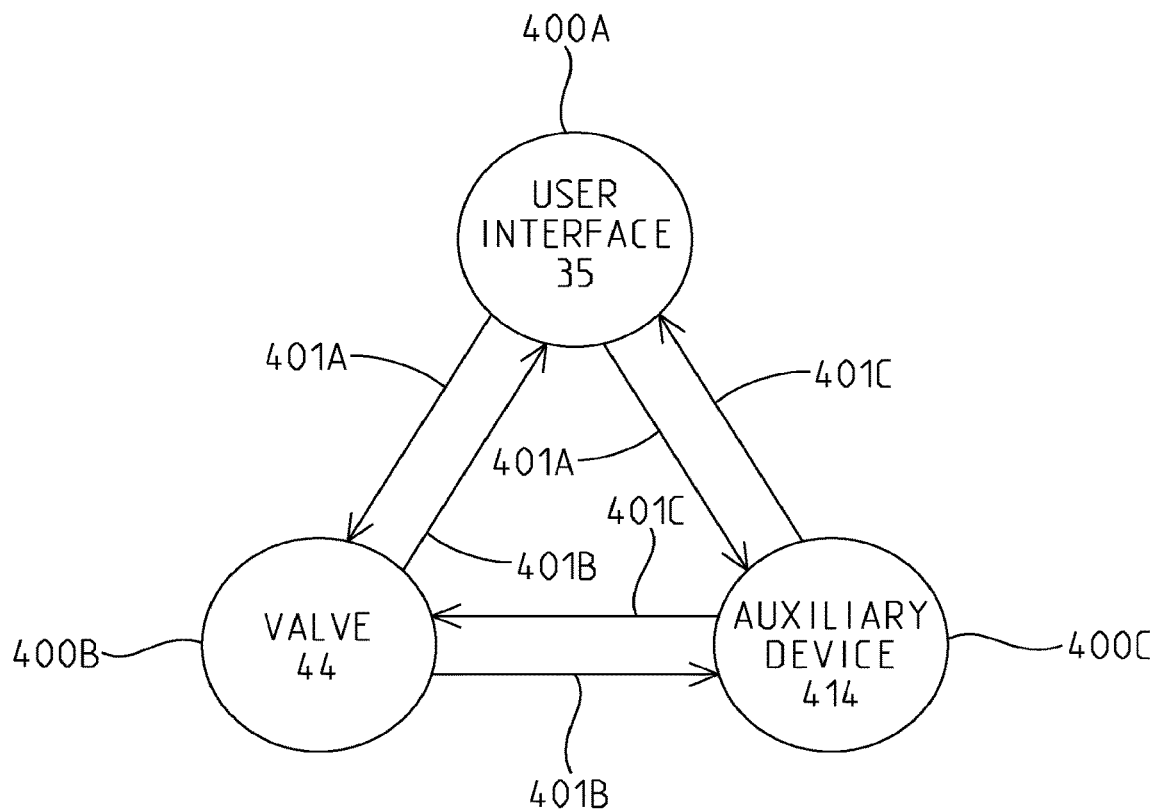
FIG. 19 is a diagrammatic representation of communication between memory devices of different faucet components.

FIG. 19 further illustrates communication between memory devices 400A, 400B, and 400C of various faucet components (illustratively each coupled with the processors 410 of FIG. 17). Representative faucet components include user interface 35, valve 44, and auxiliary device 414, respectively. Auxiliary device 414 could be a number of different faucet related components, such as a diverter valve, a soap dispenser, or a Zigbee interface (to facilitate remote communication). As shown, identification data 401A, 401B, 401C may be transferred between the respective components 35, 44 and 414.

Additionally, while the identification devices 400 detailed above illustratively store identification data 401 and communicate same to controller 50 via electrical signals (either through cables or wirelessly), other identification devices may be substituted therefor. For example, mechanical or electromechanical devices may be used to identify respective faucet components to the controller 50. Such alternative devices may include pin connectors, micro switches, and/or magnets.

Although the invention has been described in detail with reference to certain preferred embodiments, variations and modifications exist within the spirit and scope of the invention as described and defined in the following claims.

The invention claimed is:

1. An electronic faucet comprising:
an upper faucet component configured to be coupled above a sink deck, the upper faucet component including a user interface;
an electrically operable valve configured to be supported below the sink deck;
the upper faucet component including a component memory device, the component memory device storing identification data associated with the upper faucet component, wherein different identification data is associated with different types of upper faucet components; and
a controller in electrical communication with the user interface, the electrically operable valve and the component memory device, the controller configured to receive the identification data from the component memory device, the identification data representative of a control configuration of the user interface;
wherein different sets of instructions are associated with different identification data, the controller selecting one of the sets of instructions based upon the control configuration, the selected one set of instructions controlling operation of the electrically operable valve in response to input from the user interface.

2. The electronic faucet of claim 1, wherein the different types of upper faucet components include at least one of a delivery spout and a valve handle, the user interface being supported on the upper faucet component.

3. The electronic faucet of claim 1, wherein the identification data includes information on the type of user interface, and the set of instructions based upon the control configuration associates signals received by the controller from the user interface and the desired position of a valve member of the electrically operable valve.

4. The electronic faucet of claim 3, wherein the user interface comprises a rotary sensor, and the controller utilizes the control configuration to associate voltage from the rotary sensor with the desired position of the valve member.

5. The electronic faucet of claim 3, wherein the user interface comprises a capacitive sensor, and the controller utilizes the control configuration to establish a threshold voltage for valve activation.

6. The electronic faucet of claim 1, where the electrically operably valve comprises:
a mixing valve including:
a hot water inlet;
a cold water inlet spaced from the hot water inlet;
an outlet spaced from the hot water inlet and the cold water inlet; and
a valve member supported for movement relative to the hot water inlet and the cold water inlet to control the flow of water from the hot water inlet and the cold water inlet to the outlet;
an actuator operably coupled to the valve member for moving the valve member;
the controller being operably coupled to the actuator for selectively providing a flow control mode of operation and a temperature control mode of operation by causing the actuator to move the valve member; and
wherein input to the user interface within a first input range causes the controller to operate in the flow control mode, and input to the user interface within a second input range causes the controller to operate in the temperature control mode, the flow control mode positioning the valve member to provide variable flow rate of water through the cold water inlet to the outlet while preventing the flow of water through the hot water inlet to the outlet, and the temperature control mode positioning the valve member to provide substantially constant flow rate of water through the outlet and variable mixing of water from the hot water inlet and the cold water inlet to adjust the temperature of water at the outlet.

7. The electronic faucet of claim 6, further comprising:
a temperature sensor in communication with the controller and fluidly coupled to the outlet for measuring the temperature of water supplied to the outlet; and
a light supported by the input member for providing an indication of water temperature measured by the temperature sensor.

8. The electronic faucet of claim 1, wherein the component memory device comprises an electrically erasable programmable read-only memory.

9. An electronic faucet assembly comprising:
a faucet component including a component memory device;
the component memory device storing identification data associated with the faucet component, wherein different identification data is associated with different types of faucet components; and
a controller in electrical communication with the component memory device, the controller determining a control configuration based upon the identification data received from the component memory device, different control configurations being based on different identification data, and operating the faucet based upon the determined control configuration.

10. The electronic faucet of claim 9, further comprising:
a user interface supported by the faucet component; and
an electrically operable valve in electrical communication with the controller;
wherein the controller selects a set of instructions based upon the control configuration, the set of instructions controlling operation of the electrically operable valve in response to input from the user interface.

11. The electronic faucet of claim 10, wherein the different types of faucet components include at least one of a delivery spout and a valve handle, the user interface being supported on the faucet component.

12. The electronic faucet of claim 10, wherein the identification data includes information on the type of user interface, and the set of instructions based upon the control configuration associates signals received by the controller from the user interface and the desired position of a valve member of the electrically operable valve.

13. The electronic faucet of claim 12, wherein the user interface comprises a rotary sensor, and the controller utilizes the control configuration to associate voltage from the rotary sensor with the desired position of the valve member.

14. The electronic faucet of claim 12, wherein the user interface comprises a capacitive sensor, and the controller utilizes the control configuration to establish a threshold voltage for valve activation.

15. The electronic faucet of claim 9, wherein the component memory device comprises an electrically erasable programmable read-only memory.

16. An electronic faucet assembly comprising:
a faucet component including a component memory device storing identification data associated with the faucet component;
a controller in electrical communication with the component memory device, the controller determining a control configuration based upon the identification data received from the component memory device, and operating the faucet based upon the determined control configuration;
a user interface supported by the faucet component; and
an electrically operable valve in electrical communication with the controller;
wherein the controller selects a set of instructions based upon the control configuration, the set of instructions controlling operation of the electrically operable valve in response to input from the user interface; and
wherein the identification data includes information on the type of user interface, and the set of instructions based upon the control configuration associates signals received by the controller from the user interface and the desired position of a valve member of the electrically operable valve.

17. The electronic faucet of claim 16, wherein the faucet component comprises one of a delivery spout and a valve handle, the user interface being supported on the faucet component.

18. The electronic faucet of claim 16, wherein the user interface comprises a rotary sensor, and the controller utilizes the control configuration to associate voltage from the rotary sensor with the desired position of the valve member.

19. The electronic faucet of claim 16, wherein the user interface comprises a capacitive sensor, and the controller utilizes the control configuration to establish a threshold voltage for valve activation.

20. The electronic faucet of claim 16, wherein the component memory device comprises an electrically erasable programmable read-only memory.

* * * * *